United States Patent [19]

Scalzi et al.

[11] Patent Number: 5,560,013

[45] Date of Patent: Sep. 24, 1996

[54] METHOD OF USING A TARGET PROCESSOR TO EXECUTE PROGRAMS OF A SOURCE ARCHITECTURE THAT USES MULTIPLE ADDRESS SPACES

[75] Inventors: Casper A. Scalzi, Poughkeepsie, N.Y.; William J. Starke, Austin, Tex.

[73] Assignee: International Business Machines Corporation, Armonk, N.Y.

[21] Appl. No.: 349,772

[22] Filed: Dec. 6, 1994

[51] Int. Cl.[6] .................................................. G06F 9/40
[52] U.S. Cl. .................... 395/700; 395/500; 395/600; 364/280; 364/280.1; 364/228.1; 364/DIG. 1
[58] Field of Search ........................... 395/700; 396/650; 364/DIG. 1

[56] References Cited

U.S. PATENT DOCUMENTS 5,313,614  5/1994  Goettelmann et al. .................. 395/500
5,404,478  4/1995  Arai et al. ................................ 395/400

*Primary Examiner*—Kevin A. Kriess
*Assistant Examiner*—Majid A. Banankhah
*Attorney, Agent, or Firm*—Bernard M. Goldman

[57] ABSTRACT

A method of utilizing large virtual addressing in a target computer to implement an instruction set translator (1ST) for dynamically translating the machine language instructions of an alien source computer into a set of functionally equivalent target computer machine language instructions, providing in the target machine, an execution environment for source machine operating systems, application subsystems, and applications. The target system provides a unique pointer table in target virtual address space that connects each source program instruction in the multiple source virtual address spaces to a target instruction translation which emulates the function of that source instruction in the target system. The target system efficiently stores the translated executable source programs by actually storing only one copy of any source program, regardless of the number of source address spaces in which the source program exists. The target system efficiently manages dynamic changes in the source machine storage, accommodating the nature of a preemptive, multitasking source operating system. The target system preserves the security and data integrity for the source programs on a par with their security and data integrity obtainable when executing in source processors (i.e. having the source architecture as their native architecture). The target computer execution maintains source-architected logical separations between programs and data executing in different source address spaces—without a need for the target system to be aware of the source virtual address spaces.

12 Claims, 13 Drawing Sheets

METHOD OF USING A TARGET PROCESSOR TO EXECUTE PROGRAMS OF A SOURCE ARCHITECTURE THAT USES MULTIPLE ADDRESS SPACES

BACKGROUND OF THE INVENTION

The problem of moving programs from one computer architecture to another has given rise to a number of strategies for migration which minimize human effort. Among systems which support the same application interfaces, and exhibit the same security and data integrity characteristics, simple re-compilation of an application may suffice. However, this does not work in cases where high-level language source code is unavailable or where there is no compiler written for the target platform. In these cases, a more general solution is necessary to solve the problem of application migration.

Application migration is not the only problem. Application interfaces are built upon application enablement layers and operating systems, the attributes of which are highly dependent on processor architecture, and thus, may vary greatly from machine to machine. To move an application, it may also be necessary to port the application enablement environment, and possibly the underlying control program. Such an undertaking requires a great deal of human effort, and often fails to preserve the security and data integrity characteristics assumed by the users of the applications, because of operation on the original platform. A general solution to this second problem, which minimizes human effort and preserves desirable architectural attributes, would be quite beneficial in such cases.

A general solution for the first problem, application migration, is provided by an emulation technique known as binary translation, which automatically converts each machine instruction in a program written for a source processor architecture into one or more target processor machine instructions, effectively translating the source machine program, instruction by instruction, into a target machine program.

Often, binary translation is incorporated into a run-time environment, in which a previously unencountered source instruction is dynamically translated into target instructions as needed, and the translation is saved and reused the next time that particular source instruction is to be executed. Of course, data structures must be employed to track which instructions of the source program have been translated, and where the translations are stored. Also, the original source machine program instructions must be maintained, in addition to the target translations of those source instructions. This use of binary translation provides a relatively efficient means for emulating the computational and logical characteristics of a source architecture on a target processor.

Binary translation is far superior to brute force emulation techniques, which interpret source instructions as they are encountered, extracting parameters such as register specifications, and immediate data fields, and calling subroutines based on the opcode. Brute force approaches incur these penalties every time a source instruction is executed, while binary translation techniques incur such penalties only the first time a given instance of a source instruction is executed. Every subsequent execution of that particular instruction instance proceeds with the efficiency afforded by the translated code. In general, these methods have the effect of producing target machine code that has little dependence on source architecture state information, and bears a strong resemblance to code compiled natively for the target architecture.

While binary translation addresses the first problem, providing a general approach for application migration, it does not address the second problem, providing a general approach for migrating the application enablement environment and control program. Binary translation exploits the fact that most processor architectures provide similar computational and logical operations, the aspects of the architecture that are explicitly used by application programs. The layers below the application interface, which provide security and data integrity to the applications, and manage system resources which are shared by multiple independent applications, must use other facilities provided by a processor architecture. These facilities may vary greatly from architecture to architecture, particularily between CISC (Complex Instruction Set Computer) and RISC (Reduced Instruction Set Computer) architectures, and often the facilities provided by one architecture have no analog in another architecture. The inefficiencies associated with emulating these facilities in software have historically been prohibitive, thereby restricting the use of binary translation to the application domain.

For this reason, other means have generally been used to provide the characteristics of the interface to which emulated applications are written. The software layers underlying this interface are most often rewritten specifically for the target architecture at great expense. Depending on the differences in the underlying processor architectures, many of the security and data integrity characteristics of the environment may be sacrificed in the process. And, unique characteristics of the original operating system can be lost as a result. In other words, no general solution has yet addressed the second problem.

The approach described in application Ser. No. 08/349, 771, entitled "Storage Access Authorization Controls In A Computer System Using Dynamic Translation of Large Addresses", assigned to the same assignee as the present invention and filed on the same days as the present invention, incorporated here by reference, does provide a general approach to solving the second problem. By utilizing large virtual addressing in a target processor, it incorporates all the authorization mechanisms of a source processor architecture. The target processor dynamic address translation hardware is used to check the legality of storage accesses, and to map legal storage accesses such that they proceed with the efficiency of the target processor hardware after legality is established. By providing an efficient means to implement the authorization facilities of one architecture on another, it provides the impetus to extend binary translation techniques to cover the entire environment: the application layer, the application enablement environment, and the control program.

It is the goal of this invention to have one computer, the target, provide the necessary program execution environment of another computer, the source, by means of the binary translation of the instructions of the source computer to those of the target computer, such that the control program, application enablement environment, and application programs perform their functions on the target computer in the same manner as they do on the source computer. From the point of view of the computing establishment, the source machine characteristics are observed in the target machine operation, and include the security, integrity, and functional aspects, including those provided by the source operating system, all without the cost of implementing the desired elements of the source as native elements of the target.

Due to their limited scope, existing binary translation techniques are heavily optimized around the issues which exist in the application domain. They do not need to manage the additional complexities which are handled in the software layers beneath the application interface. The approach described in this invention re-focuses the implementation of these techniques, making them feasible for the emulation of the entire system environment.

When the emulated portion of the system environment is extended beyond the application layer, to include the application enablement and control program layers, the ground rules change drastically. The purpose of a multitasking operating system is to maximize the value provided by computing resources, by efficiently distributing them between multiple applications. To do so it must manage the asynchronous events that are part of the total computing environment. As a consequence of such events, the operating system will interrupt the flow of one program and divert computing resources to another. Of course, it must keep track of the current instruction address for the interrupted program, so that the program can resume execution where it left off.

As stated above, most existing binary translation approaches emulate the application domain only, and run on an application interface which runs natively on the target processor. From the perspective of the target operating system, the emulation environment built around each emulated source application is just another target application. Thus, when the multitasking target operating system pre-empts an emulated source machine program, the return address is actually a target machine address.

However, when the emulated portion of the system environment includes the source operating system, and the interruptions themselves are emulated, the return addresses for preempted programs are source machine addresses. This is because the applications are running under the direct control of the source operating system, which dynamically allocates the system resources among them. Likewise, synchronous and asynchronous exceptions, such as page faults and I/O interrupts, require that a source address be used to determine the point of re-entry into the interrupted program. This is because the source operating system handles these events within the emulated source operating environment. Essentially, even though the application is being executed by means of binary translation, it is executing in a source machine operating environment.

When limited to the application domain, binary translation requires code entry points determined by source addresses only for branches within an application which cannot be determined by static analysis. Existing techniques focus heavily on this, going to great lengths to minimize the number of source entry points. When extended to include the operating system, binary translation requires a code entry point following every possible point of program preemption. This results in a huge increase in the number of possible entry points, specified by a source machine address, in an emulated program. The invention described herein alleviates the severe performance repercussions that such an increase would cause in normal binary translation environments. Also, existing techniques map source instructions in a single application address space to a set of translations for those instructions. When the entire system environment is emulated, there are multiple address spaces, each potentially containing instructions which must be emulated.

The ramifications of dynamic address translation and the possibility of programs shared between multiple address spaces add complexity and potential for new optimizations, while vastly increasing the scope of the translation management algorithms. For example, some operating system structures map the same system code into all instruction address spaces in order to improve system performance of linkage to, and data access by, that code. If applied to a multi-space emulation environment, traditional techniques would produce multiple translations for the same code, one for each address space that the code is part of. It is advantageous to minimize such duplication. The method described here discovers such multiple mappings of code through use of source DAT, and causes an existing translation of code to be used for all its uses in the source.

Finally, the existing techniques are static in nature, since the code in an application environment is generally not modified during its execution. An entire system environment, on the other hand, is very dynamic in nature. Given the objective of providing the full operational characteristics of the source operating system and those of its native application enablement programs in the emulated environment, full multitasking of multiple applications and application enablement programs must be supported. Application environments are instantiated and discarded. Programs are loaded, and overwritten. The source operating system controls the allocation and deallocation of the assigned source storage, allocated within the target machine storage. Real page frames are allocated in the source storage to back virtual pages, and eventually deallocated. Thus, the algorithms designed to maintain an emulated system environment must support the management of this volatility by creating and destroying target translations as source instructions are created and destroyed in the emulated environment.

SUMMARY OF THE INVENTION

A "source program" is herein defined as a program written for a processor architecture which is alien to the architecture of the target processor. A "source program" contains instructions, operating states and requires executing facilities not found in the target processor architecture. In this specification, the term, source program, is therefore different from, and should not be confused with, a common use of the term "source program" as a program in a high-level language distinguished from the same program in executable object code form. Also, the words machine and processor are often used interchangeably throughout the description of this invention.

As discussed in the background, this invention assumes the methods described in application Ser. No. 08/349,771 for implementing the source processor's architected state and the controls thereof on the target processor. The same requirements on source and target processor attributes are assumed as well, as this invention imposes no additional requirements beyond those described in application Ser. No. 08/349,771.

Application Ser. No. 08/349,771 describes several structures that are established in target machine virtual and target machine real storage that are used in an embodiment of that invention. These include, but are not limited to, target exploded virtual storage, to which all combinations of source effective addresses and storage access states map directly; source real storage, which is represented by a contiguous area of target real storage; the source processor registers, some of which are represented by target processor registers, and others of which are represented within target storage; and the source frame-to-PTE-list directory and single-frame-PTE-list area, which are used to manage the mapping of multiple virtual pages to a single real page frame. These structures are assumed by this invention.

This invention includes a number of additional structures, which maintain the target machine equivalents of source program instructions, in a manner similar to that of existing binary translation techniques, yet extended to assume the techniques of application Ser. No. 08/349,771, while addressing the issues associated with emulating an entire system operating environment. These structures include an instruction translation map (ITM), an instruction translation region (ITR), and additional structures which are required to effectively maintain the ITM and the ITR. The ITM associates source machine instructions, found in source storage, with the target machine translations of these instructions, which translations are found in the ITR.

FIG. 1 shows a memory map of target machine virtual storage and a memory map of target machine real storage. The important structures used by an emulator which pertain to this invention are shown. The dotted arrows indicate the dynamic address translation (DAT) relationships between structures which exist in virtual storage and the structures in real storage which back them.

This invention relies on a large virtual addressibility in the target machine, as described in the separate application Ser. No. 08/349,771, which is assumed by this invention. The structures which exist in target machine virtual storage are described here.

The emulator control program (102) manages the target processor resources as specified in the flowcharts (FIGS. 9 through 13) of this invention and the flowcharts (FIGS. 26 and 27) of 08/349,771, which this invention assumes, by handling target machine exception conditions and performing various operations on the structures described in this invention and in 08/349,771 as specified herein, as well as managing the target machine page table, and any input/output operations required by a specific embodiment. The emulator control program (102) is backed in real storage in part by the pinned control program area (107), and in part by the demand paging storage pool (108). These methods for backing virtual storage with real storage are well known in the prior art.

The instruction set translator (103) is a program which performs several functions related to translating one or more source machine instructions into a set of target machine instructions which perform the equivalent function, and maintaining the translations which it produces. The requirements for the interface to the IST, the types of services provided by the IST, and certain attributes of the target machine instructions produced by the IST are specified in this invention and in 2nd in 08/349,771 (which is assumed by this invention). The portion of the IST which produces target machine translations of source machine instructions is hereafter called the translator function, and the portion of the IST which provided storage management services is hereafter called the translation management function. The IST (103) is backed in real storage by page frames from the demand paging storage pool (108). This methods for backing virtual storage with real storage is well known in the prior art.

Source machine exploded storage (104) is a very large area of target machine virtual storage which area encompasses all of the exploded permutations of all source machine storage locations across all source machine virtual address spaces, the source machine DAT-off address space, and all source machine unresolved address space encodings.

It is described in detail in 08/349,771 (which is assumed by this invention), where it is called target exploded virtual storage (since it resides in the target machine's virtual storage). The location of source machine exploded storage (104) in target machine virtual storage is indicated by BASE A, which specifies a displacement from target virtual storage address zero. BASE A is referred to later in this invention. Since source machine exploded storage (104) is the virtual representation of the contents of the source machine's memory, it is backed in target machine real storage by source machine real storage (109), which is a contiguous range of target machine real storage which contains the storage contents of the source machine being emulated. The algorithm which specifies the means and method by which source machine exploded storage pages are backed by source machine real storage page frames is a subject of application Ser. No. 08/349,771, which is assumed in this invention. In the figure, the arrow which indicates the DAT relationship between source machine exploded storage (104) and source machine real storage (109) is split at the end to indicate that multiple pages in source machine exploded storage (104) may be backed by the same page frame in the source machine real storage (109) portion of target machine real storage.

This results in complications which are described in application Ser. No. 08/349,771, and later in this invention. Since source machine exploded storage (104) is a virtual representation of the entire contents of the source machine's memory, each source machine instruction existing in the source machine's memory will reside at one or more locations in source machine exploded storage (104).

The instruction translation map (105) occupies a very large range of target machine virtual storage. It is a large table of pointers to instruction translations. There is one such pointer in the ITM for every possible storage location at which an instruction can exist in a source machine address space across all possible source address spaces.

For example, if a source machine supports a 31-bit address, and requires that all instructions begin on a two-byte boundary, then there are $2^{}(31)/2=2^{}30=1,073,741,824$ possible locations at which a source instruction may reside in a source address space. If the source machine supports a 16-bit address space identifier, then there are $2^{}(46)=65536$ possible address spaces. Thus there are $2^{}(46)=70,368,744,177,664$ possible locations at which an instruction may reside across all source address spaces. It follows that the virtual representation of the ITM in this case would be a table in virtual storage only, containing 70,368,744,177,664 pointers to possible instruction translations. These translations exist in the instruction translation region (106) which is backed in real storage by the real ITR (114). Due to its immense size and sparcity, the virtual ITM (105) is backed by a significantly smaller pool of real storage called the real ITM cache (111). The algorithm which specifies the means and method by which virtual ITM pages are backed by real ITM cache page frames is described later in this invention. In the figure, the arrow which indicates the DAT relationship between the virtual ITM (105) and real ITM cache (111) is split at the end to indicate that multiple pages in the virtual ITM (105) may be backed by the same page frame in the real ITM cache (111) portion of target machine real storage. This results in complications similar to those described in 08/349,771 for handling source exploded addresses, and later in this invention. The location of the virtual ITM (105) in target machine virtual storage is indicated by BASE B, which specifies a displacement from target virtual storage address zero. BASE B is referred to later in this invention. The ITM is divided into uniformly sized sections which are related to corresponding sections in the instruction translation region (106) and source machine real storage (109). The relationships between these are described later.

The instruction translation region (106) also occupies a very large range of target machine virtual storage. It is divided into uniformly sized sections, such that each instruction translation region (ITR) section maps directly to a corresponding section of source machine real storage (109) and to a corresponding section of the ITM (105). The details of these relationships are described later. The amount of target machine virtual storage allocated to a virtual ITR section must be sufficiently large to contain all of the target machine translated code associated with all of the source machine instructions in a section of source machine real storage (109) in a worst case scenario. There is one such ITR section permanently assigned to each section of source machine real storage (109). For example, a particular embodiment may choose to allocate 1,048,576 bytes for each virtual ITR section corresponding to a 1,024 byte source machine real storage section. If the source machine has a total of 2,147,483,648 bytes of real storage, the size of the virtual ITR would be 2,199,023,255,552 bytes. The instruction translations maintained in the virtual ITR (106) are located by the pointers contained in the ITM (105). Due to its immense size and sparcity, the virtual ITR (106) is backed by a significantly smaller pool of real storage called the real ITR (112). Real ITR page frames are allocated to virtual ITR pages in a demand paging fashion well known in the prior art. The location of the virtual ITR (105) in target machine virtual storage is indicated by BASE F, which specifies a displacement from target virtual storage address zero. BASE F is referred to later in this invention.

The structures which exist in target machine real storage are described here.

The pinned control program area (107) is an area of target machine real storage which is permanently assigned ("pinned") to portions of the emulator control program (102) and its data structures. Such techniques are well known in the prior art.

The demand paging storage pool (108) is an area of target machine real storage from which page frames are allocated as needed to back currently active portions of the emulator control program (102), the instruction set translator (103), and their associated data structures. Such techniques are well known in the prior art.

Source machine real storage (109) is a contiguous range of target machine real storage which contains the real storage contents of the source machine being emulated. Page frames in source machine real storage (109) back the virtual pages in source machine exploded storage (104). The algorithm which specifies the means and method by which source machine exploded storage pages are backed by source machine real storage page frames is a subject of separate application Ser. No. 08/349,771, which is assumed in this invention. In the figure, the arrow which indicates the DAT relationship between source machine exploded storage (104) and source machine real storage (109) is split at the end to indicate that multiple pages in source machine exploded storage (104) may be backed by the same page frame in the source machine real storage (109) portion of target machine real storage. This results in complications which are described in application Ser. No. 08/349,771, and later in this invention. Since source machine real storage (109) is a real storage representation of the entire contents of the source machine's memory, each source machine instruction existing in the source machine's memory will reside at one and only one location in source machine real storage (109). The location of source machine real storage (109) in target machine real storage is indicated by BASE D, which specifies a displacement from target real storage address zero. BASE D is referred to later in this invention. As described earlier, source machine real storage is divided into uniformly sized sections. These are related to corresponding sections in the ITM (105) and in the ITR (106). The relationships between these are described later. The real ITM directory (110) is a table in target real storage which contains one pointer for each section of source machine real storage (109). If the pointer contains a NULL value, its corresponding source machine real storage section does not have an associated ITM section in the real ITM cache (111). If the pointer is valid, it points to the ITM section in the real ITM cache that is associated with its corresponding source machine real storage section. The real ITM directory exists in target real storage only, i.e., it is only accessed by the emulator when the target machine is in DAT-off mode. The location of the real ITM directory (110) in target machine real storage is indicated by BASE E, which specifies a displacement from target real storage address zero. BASE E is referred to later in this invention.

The real ITM cache (111) is a pool of real storage which backs the most recently used pages in the virtual ITM (105). The algorithm which specifies the means and method by which virtual ITM pages are backed by real ITM cache page frames is described later in this invention. In the figure, the arrow which indicates the DAT relationship between the virtual ITM (105) and real ITM cache (111) is split at the end to indicate that multiple pages in the virtual ITM (105) may be backed by the same page frame in the real ITM cache (111) portion of target machine real storage. This results in complications which are described in application Ser. No. 08/349,771, and later in this invention. The location of the real ITM cache (111) in target machine real storage is indicated by BASE C, which specifies a displacement from target real storage address zero. BASE C is referred to later in this invention. Since its backs the virtual ITM (105), the real ITM cache is also divided into uniformly sized sections. A section in the real ITM cache (111) that is associated with a given section of source machine real storage (109) may be located by consulting the real ITM directory (110). This is described in detail later.

The target machine page table (112) exists in target real storage. It contains the page table entries which are used by the target machine DAT mechanism to translate target machine virtual addresses to target machine real addresses. The target machine DAT mechanism is not a subject of this invention, and the invention may embody any target DAT mechanism that does not preclude the association of multiple virtual pages with a single real page frame.

The frame-to-PTE-list directory (FPD) and single-frame-PTE-list (SFP) are structures which are used to manage the mapping of multiple virtual pages to a single real page frame. This is discussed in application Ser. No. 08/349,771, and later in this invention. These structures exist in target real storage (113) only, i.e., they are only accessed by the emulator when the target machine is in DAT-off mode.

The real ITR (114) is a pool of real storage which backs the most recently used pages in the virtual ITR (106). Techniques for backing recently used pages are well known in the prior art.

FIG. 2 shows the relationships among the major structures used by the invention.

Source exploded virtual storage (201) is described in FIG. 1 (104), and in detail in application Ser. No. 08/349,771, which is assumed by this invention. An address in source exploded virtual storage is the input to the process which finds the target machine instruction translation for the source machine instruction which resides at that address. Specifically, the source processor effective instruction address, combined with the address space identifier for the address space from which an instruction is to be fetched indicates a unique source instruction reference from the program's perspective.

The virtual ITM (202) is a table which contains an entry for each possible unique addressable instruction contained in source exploded virtual storage (201). It is assigned a contiguous area of the large target machine virtual address space. Because of this direct, one-to-one mapping, a relationship (208) exists between source exploded virtual storage (201) and the virtual ITM (202), such that given an address into one, the corresponding address in the other may be determined directly. The virtual ITM (202) exists in target virtual storage only, thus, its size requirements, while significant, are accommodated by target machines which meet the large virtual storage requirements enumerated in application Ser. No. 08/349,771. The entries in the virtual ITM (202) are described in the following section which describes the real ITM cache (203).

The real ITM cache (203) is the pool of target real storage which backs the most recently used entries in the virtual ITM (202). Thus, when a target machine page table entry (PTE) exists which maps a page in the virtual ITM (202) to a page frame in the real ITM cache (203), a relationship (209) exists which automatically maps references to the virtual ITM, by target machine dynamic address translation (DAT), to the real ITM cache. When no such PTE exists, the relationship (209) is non-existent. The management of such a situation is described later. Each ITM entry contains two elements. The first element is either a pointer to the set of target instructions which correspond to the source instruction at a given source storage location, or a pointer to the entry point for a function, called the translator, which produces a set of target instructions given a source instruction. The second element contains information related to the span of the source instruction image whose translation is mapped by the entry. The term ITM section is defined to be the unit of granularity by which the real ITM cache (203) backs the virtual ITM (202). For obvious reasons an ITM section must be no smaller than a page of target storage, however, it may be larger, provided that it is an exact multiple of the target page size. The term source storage section is defined to be a unit of source storage that directly corresponds to an ITM section. For example, if source instructions are addressable on two-byte boundaries, and ITM entries are eight bytes in size, and the size of an ITM section is set at 4096 bytes, the size of a source storage section would be 1024 bytes. The term ITR section is defined to be a unit of ITR virtual storage that directly corresponds to an ITM section and a source storage section. The ITR section is described fully below.

The virtual ITR (204) is a large area of target virtual storage which contains the sets of target instructions or translator function entry points referenced by the first element of each entry in the real ITM cache (203). The virtual ITR (204) is divided into ITR sections that directly correspond to ITM sections and source storage sections. A direct, one-to-one relationship (215) exists between the virtual ITR (204) and source real storage (206), such that each source storage section in source real storage (206), has a corresponding ITR section in the virtual ITR (204). Therefore, ITR sections may be arbitrarily large, as long as the virtual ITR (204) contains one ITR section for each source storage section in source real storage (206). An ITR section should be large enough to hold the translations for all possible source instructions in the source storage section associated with it. The internal organization and storage management of the virtual ITR is described later. When an entry in the real ITM cache (203) holds a pointer to a set of target instructions which correspond to a source instruction, which target instructions will be found in the ITR section associated with the ITM section, a relationship (210) exists through which a pointer in the real ITM cache is used to access an instruction translation. When an entry holds a pointer to the translator function for the ITR section, which translator function entry point will be found in the ITR section associated with the ITM section, the relationship (210) is non-existent. The management of such a situation is described later.

The real ITR (205) is the pool of target real storage which backs the most recently used pages in the virtual ITR (204). Thus, when a target machine page table entry (PTE) exists which maps a page in the virtual ITR (204) to a page frame in the real ITR (205), a relationship (211) exists which automatically maps references to the virtual ITR, by target machine dynamic address translation (DAT), to the real ITR. When no such PTE exists, the relationship (209) is non-existent. The management of such a situation is described later.

Source real storage (206) is the contiguous block of target real storage which directly represents source machine real storage. It is the ultimate repository of source programs, source data, and source control structures such as page tables. Since it either backs all source virtual storage pages or contains the structures used by the algorithms which back all source virtual storage pages on demand, there is a relationship (212), by which references to source exploded virtual storage (201) are mapped to source real storage (206) through the use of the source DAT mechanisms. As described above, there is a direct, one-to-one relationship (215) between each source storage section in source real storage, and its corresponding ITR section in the virtual ITR (204). That is, the translations for the instructions found in a source storage section in source real storage (206) are maintained in the corresponding ITR section found in the virtual ITR (204), backed by pages from the real ITR (205).

The real ITM directory (207) is a table, which exists in target real storage, that contains an entry for each source storage section in source real storage (206). Because of this direct, one-to-one mapping, a relationship (213) exists between source real storage (206) and the real ITM directory (207). Each entry in the real ITM directory (207) contains either a pointer to the ITM section in the real ITM cache (203) which contains the set of entries which map the source instruction images contained in the source storage section found in source real storage (206) which corresponds to the entry in the real ITM directory (207), or a NULL pointer if there is no ITM section in the real ITM cache (203) corresponding to the source storage section in source real storage (206). In the former case, a relationship (214) exists through which a pointer in the real ITM directory (207) is used to access an ITM section in the real ITM cache (203). In the NULL case, the relationship (214) is non-existent. The management of such a situation is described later.

For simplicity the real ITM cache (203) and the real ITR (205) have been described as independent pools of real storage, dedicated to backing their respective virtual structures. Depending on the embodiment, however, it is likely that the real ITR (205), and possibly the real ITM cache (203) may be drawn from a common, demand-paging pool of real storage in the target machine. However, source real storage (206) and the real ITM directory (207) must be independent contiguous areas of target real storage.

The goal of efficiently locating a set of target machine instructions associated with a source machine effective instruction address is attained as described below. It is assumed in this process that any source page fault caused by an access to the source instruction being executed has been resolved, i.e., that relationship (212) exists. This may be tested by employing the techniques described in application Ser. No. 08/349,771 to perform an emulated source instruction fetch. As stated above, the source effective instruction address combined with the source address space identifier for the source address space in which the source instruction exists (both of which may be extracted from the source exploded virtual address) yield an index into the virtual ITM (202). When the DAT relationship (209) exists (it does in steady-state operation), an address into the real ITM cache (203) is produced by the target machine DAT hardware. The case in which the DAT relationship (209) does not exist is called an ITM fault, and is described later. In the case where the DAT relationship (209) does exist, the referenced real ITM cache entry contains a pointer. When this pointer references the set of target instructions that make up the translation of the source instruction (the steady-state case), i.e., the relationship (210) exists, the address into the virtual ITR (204) is known. The case in which the relationship (210) does not exist is called a translation miss, and is described later. If the relationship (210) does exist, the address into the virtual ITR is converted, by target machine DAT, into an address into the real ITR. If the DAT relationship (211) exists, the process is complete, and the set of target instructions may be executed. If the relationship (211) does not exist, an ITR fault occurs, and the target machine must allocate a frame from the real ITR to back the virtual page.

In the event of a translation miss, i.e., relationship (210) does not exist, the pointer in the ITM points to the translator function entry point in the ITR section instead of a translation. The translator function (or IST) has the responsibility of producing a set of target instructions to perform the function of the source instruction, managing the placement of these instructions into the virtual ITR section associated with the source real storage section from which the source instruction image was obtained, replacing the reference to itself in the ITM, with a pointer to the newly created target instructions, and indicating the span of the translation in the ITM. This action establishes relationship (210), and completes the process of finding the desired set of target instructions.

In the event of an ITM fault, i.e., relationship (209) does not exist, the target machine observes a page fault, and the appropriate target machine exception handler is invoked. The exception handler determines, from the fact that the faulting virtual address referenced the area of target virtual storage allocated to the virtual ITM, that an ITM fault has occurred. The faulting address into the virtual ITM (202) is converted, by direct relationship (208), to an address into source exploded storage (201), which is converted, by source DAT relationship (212), to an address into source real storage (206). Note that when an ITM fault occurs, this DAT relationship (212) is guaranteed to exist, as stated above. The address into source real storage (206) is converted, by direct relationship (213), to an address into the real ITM directory (207). If the real ITM directory entry referenced by this address contains a NULL pointer, the pointer relationship (214) does not exist. This situation is called an ITM miss, and is described later. If the relationship (214) does exist, the pointer in the real ITM directory entry points to the ITM section in the real ITM cache (203) which is to back the ITM section in the virtual ITM (202) which caused the ITM fault. One or more target PTE's (depending on the size of an ITM section) are allocated to establish the DAT relationship (209) between the faulting ITM section in the virtual ITM (202) and the ITM section in the real ITM cache (203). As a means to detect modification of the instruction stream, a control mechanism must be implemented using either the methods described in application Ser. No. 08/349,771 or a native store protection mechanism inherent in the target processor architecture, to protect the emulated source storage pages related to the virtual ITM section from stores. This will cause any stores to source storage that is associated with an ITM section that exists in the real ITM cache (203), to result in a target exception, so that appropriate action may be taken to update the ITM and ITR when source instruction images are modified. Such a control mechanism is described later. Once relationship (209) is established and the source storage protections are in place, the original interrupted process can resume.

In the event of an ITM miss, i.e., relationship (214) does not exist, there is no ITM section in the real ITM cache (203) to back the ITM section in the virtual ITM (202), so one must be allocated. Normally such an allocation requires that an old ITM section in the real ITM cache (203) be destroyed to make room for the new ITM section. The algorithm used to determine which ITM section to destroy is not a subject of this invention, although it is recommended that this algorithm employ some kind of least-recently-used (LRU) scheme, such as testing the reference bits associated with pages of storage. When destroying the ITM section in the real ITM cache (203), the real ITM directory (207) entry associated with the old ITM section must be set to NULL. This is done by looking up any of the entries in the ITM section to determine the ITR section, and from that, to determine the source real storage section, and from its address, to determine the real ITM directory entry. Also, all virtual mappings to the old ITM section must be destroyed as well. Since it is possible that multiple mappings may exist, it is necessary to keep track of all virtual ITM (202) pages associated with a given real page frame in the real ITM cache (203). This may be accomplished using the techniques for managing multiple-virtual-to-single-real page mappings described in application Ser. No. 08/349, 771. A particular embodiment may determine that, at this time, it is advantageous to remove the store protection from the source storage associated with the ITM section. This, however, is not required, as a particular embodiment may decide to wait until an exception occurs and, at that time, upon discovering that the store protection exists for no apparent reason, the embodiment may remove it. It is also possible, though not required, to free real page frames that back virtual pages in the virtual ITR (204) that are referenced by the ITM entries in the ITM section that is being destroyed, since the information they contain is no longer relevant. Once the old ITM section is destroyed, a new one may be created. This is accomplished by using the address into source real storage (206) which was determined during the resolution of the initial ITM fault, and converting it by direct relationship (215), to the address into the virtual ITR (204). This address is rounded down to the beginning of an ITR section. An ITR header structure is placed at this location. An ITR header structure is used to provide a unique entry point to the translator function, which is associated with a particular ITR section, and to provide the state information used by the translator function to manage the translations maintained in that ITR section. The organization of the ITR header structure is determined by the translation management function. Note that storing the ITR header structure may cause a target page fault, which must be managed in normal fashion by demand paging from the real ITR (205). All entries in the new ITM section are initialized to point to the translator function entry in the ITR header structure. The real storage address of the new ITM section (in the real ITM cache) is placed in the real ITM directory (207) entry which was determined during the resolution of the initial ITM fault, thus establishing the pointer relationship (214). It is necessary to apply the storage protection mechanisms referenced earlier to emulated source storage page(s) associated with the new ITM section. Once relationship (214) is established and the source storage protections are in place, the ITM fault process can resume.

The goal of maintaining a single set of translations for programs that are mapped into multiple source effective address spaces is attained by taking advantage of the fact that such duplication exists only in source exploded virtual storage (201), and not in source real storage (206), which is the ultimate repository for source machine instructions. By associating the target translations of source instructions, which translations are found in the virtual ITR (204), with the mapping of those source instructions in source real storage (206), unnecessary duplication can be eliminated. Thus, relationship (215) establishes this association of instruction images in source real storage (206) to their target machine equivalents in the virtual ITR (204). At odds with this, is the requirement that a translation must be located given the address of its corresponding source instruction in source exploded virtual storage (201). There may be many such source exploded virtual locations which are backed by the same source real location, and are thus associated with the same translation. Therefore, the ITM, which associates source instruction images with their translations in the ITR, must index the translations by components of source exploded virtual addresses, while the translations themselves are associated with source real addresses. Another important consideration is minimizing the target real storage requirements of the ITM, by eliminating duplication there as well.

An optimal solution is attained by utilizing the free association provided by target DAT to break the ITM into two representations: a virtual representation, the virtual ITM (202), which has a direct relationship (208) to source exploded virtual storage (201); and a real representation, the real ITM cache (203), in which each real ITM cache (203) section has a one-to-one relationship (210) with a virtual ITR (204) section, which, in turn, has a one-to-one relationship (215) with a source real storage (206) section. Thus, for each section of source real storage, there is at most one set of instruction translations in the ITR, and at most one ITM section in the real ITM cache (203). In other words, regardless of the number of source address spaces that contain a particular set of instructions, only one set of translations exists in the target real storage, and all virtual ITM sections for the particular set of instructions are backed by the same real ITM cache section. This minimizes target real storage consumption. Target DAT provides the relationship (209) which ties together the virtual ITM (202) and the real ITM cache (203). The techniques described in application Ser. No. 08/349,771 are employed to manage the multiple-virtual-to-single-real mappings and the real ITM directory (207) is used as described earlier to create the mappings.

The goal of managing the volatility of an emulated source machine operating environment is attained by incorporating the ability to detect changes in that environment, and the means to manage system resources so as to react to those changes in an efficient manner. This is closely related to the goal of an operating system, and, in fact, the emulated source machine operating system will address these issues insofar as they pertain to those portions of the target machine that represent source machine facilities. The ITM and ITR are not source machine facilities, and the source operating system has no knowledge of them. They are, however, affected by the actions of the source machine, and therefore it is necessary to detect such source machine actions and reflect their consequences in the ITM and ITR. At the same time, the target machine must manage the resources used by the ITM and ITR as efficiently as possible.

The translations maintained in the ITR are dependent on the instruction images in source real storage (206). Therefore, if a translation exists in the ITR for a given source instruction image, and that source instruction image is modified by a source machine operation, such modification must be detected, and the ITM and ITR must be updated accordingly, to reflect the effects of the modification.

To this end, a store protection mechanism, provided either by the techniques described in application Ser. No. 08/349,771, or by the target machine hardware, is employed, which causes a target machine exception whenever a store to a protected page occurs. As in application Ser. No. 08/349,771, storage references can be qualified in target exploded virtual addresses by whether they are fetches or stores. Fetches can be allowed to operate at full processor speed. Stores to source pages containing translated instructions can be trapped by a page fault on the exploded address, and checked to determine whether or not they will modify a translated instruction. On the other hand, a target processor may contain a facility to protect a page from a store while allowing fetches to proceed without interference. Such a mechanism may protect a real storage page frame, as does the storage key of IBM S/390, or it may protect a virtual page by providing the specification of store protection in a page table entry, as in the PowerPC architecture. This invention requires that stores into already translated source instructions be detected, but is not dependent on the specific mechanism used to do so. The methods described provide correct functional operation of the total source operating environment regardless of such changes in instructions. This is achieved by the dynamic binary translation of the instructions not yet translated, and the detection of stores into already translated instructions and the invalidation of affected translations. The protection is applied to all pages which represent source machine pages for which an ITM section resides in the real ITM cache (203). This is accomplished by identifying all such pages at the time when the ITM section is created (refer to ITM misses), and, if necessary, by protecting virtual pages or their backing page frames as they are added to the set of such pages (refer to ITM faults).

When such an exception occurs, the target machine exception handler must first determine if the exception was caused by storing into a page containing instructions for which an ITM section and ITR region currently exist. This can be accomplished quickly, by determining the real ITM directory (207) entry associated with the source real storage backing the store which caused the exception. If the entry contains a NULL pointer, there is no ITM section associated with the storage. This points to one of two possibilities: either a source authorization mechanism caused the exception, or there was previously an ITM section associated with the source page, and when that ITM section was destroyed, the store protection was not removed. If the real ITM directory (207) entry contains a valid pointer, there is an ITM section associated with the storage. In this case there are also two possibilities: there may or may not be a source storage authorization violation in addition to the ITM related exception. Thus, regardless of whether the ITM section exists, the methods of application Ser. No. 08/349,771 must be used to determine whether or not a source storage authorization violation has occurred. If so, the appropriate source exception must be emulated in the source operating environment. If not, and no ITM section exists, the store protection can be removed, and the violating store re-executed. If not, and an ITM section does exist, the individual ITM entries affected by the store must be checked. This case, in which pointer and span information in these entries indicates that a translation has been affected by an overwrite of all or part of a source instruction, is called a translation corruption, and is described later. In the case in which the pointers in affected entries point to the translator function, no translations are affected, and the target machine can simply emulate the effects of the store, and return control to the instruction following the store.

In the event of a translation corruption, the ITM and ITR must be updated to reflect the change in source machine storage. The span field of the ITM can be used to calculate the scope of a store operation into a program. If any part of an already translated source instruction is altered during source machine execution, either its ITM entry must be reset to return to the translator if the translation is subsequently executed, or the real ITM section can be deallocated. Specific actions in consequence of such an invalidation of an existing translation are the responsibility of the translation management function. Regardless of the action of the translation manager, control must finally be returned to the original exception handler, to emulate the modification of source machine storage.

As a result of this kind of storage volatility, it may not be wise to expend a great deal of effort optimizing the translated code. Due to the shorter life span of translations in a fully functional source operating system, the fixed overhead associated with optimizing a translation contributes to a higher per-execution overhead. One of the effects of less optimization is an increase in the number of source machine code entry points. Without the efficient lookup mechanisms described earlier, including beneficial use of the large virtual address space of the target processor, such an increase would produce unfavorable performance implications. Thus, the benefit realized by these mechanisms is increased by the effects of the storage volatility in the full source operating environment emulation.

It is an object of this invention to have one computer, called the target, provide the complete program execution environment of another computer, called the source, by means of binary translation of the instructions of the source computer to those of the target computer such that the control program, the application enablement programs, and the application programs of the source execute on the target as they do on the source without change to any of the programs.

It is another object of this invention to provide the program execution environment of a source computer on a different target computer, using binary translation of source instructions to target instructions, and utilizing the methods of application Ser. No. 08/349,771 to provide the storage access authority states of the source in the target operation of source programs.

It is another object of this invention to use the large virtual address space of the target machine to provide a direct addressing relationship, requiring a minimum number of steps for access, between source virtual addresses and an instruction translation map indicating target machine instruction translations of the source instructions at those addresses.

It is another object of this invention to use the large virtual address space of the target machine to provide a direct addressing relationship, requiring a minimum number of steps for access, between each section of source real storage within the target and the section of target virtual storage which contains the target instruction translations instructions in the section of source real storage.

It is another object of this invention to use the large virtual address space of the target machine to provide a direct-address map of source machine instructions to target machine instruction translations, in addition to its use for providing the storage addressing required by the source programming execution environment, which includes those source instructions.

It is another object of this invention to back in target real storage the direct virtually-addressed map that associates source instructions with the corresponding target instruction translations in such a way that those portions of the map which associate source instructions that are common to multiple source address spaces with corresponding target translations are backed by the same target real storage.

It is another object of this invention to maintain a single copy in target real storage of the target machine instruction translations of source instructions that are common to multiple source virtual address spaces.

It is another object of this invention to use target machine real storage to back only the sections of the direct map of source machine instructions to target machine translations for those instruction translations currently being maintained, indicating these sections by use of a directory which associates source real storage sections with the target real storage map sections for target translations of source instructions in those source real storage sections.

It is another object of this invention to use target real storage to back only the sections of the target translations of source instructions for which a map section exists in target real storage, which associates source instructions with valid target translations.

It is another object of this invention to use the method of application Ser. No. 08/349,771 to relate all map sections in target virtual storage backed by a single map section in target real storage, because they are for the same source machine instructions in multiple source address spaces, such that given any specific map section in target real storage, all map sections in target virtual storage that it backs can be determined.

It is another object of this invention to impose store protection on target storage containing source machine instructions whose target translations are currently being maintained, by using either the methods described in application Ser. No. 08/349,771 or the native facilities of the target machine, such that modifications made by a source machine program to such instructions are detected.

It is another object of this invention to record the source machine storage span represented by a target machine translation of a source instruction, such that, on source machine storage operations modifying any part of already translated source instructions, it can be determined which translation or translations must be discarded, if any.

It is another object of this invention to use the large virtual address space of a target machine to provide a unique area of target machine virtual storage for each unique section of source machine real storage, such that this unique area of target machine virtual storage is of sufficient size to hold the target machine translations for every source machine instruction found in the source machine real storage section, and that this unique area of target machine virtual storage may be backed in target machine real storage by demand paging to manage the amount of real storage required to store the translations.

EMBODIMENT OF THE INVENTION

The preferred embodiment shows the techniques of this invention as applied to the emulation of the IBM S/390 (source) processor architecture on the 64-bit version of the IBM PowerPC (target) processor architecture. A 31-bit S/390 virtual or real address is assumed. A 24-bit ASID is assumed. A 4-bit S/390 PSW key is assumed. A maximum of 2 additional bits are allotted for other S/390 access control fields (see 08/349,771, which is assumed by this invention). A 64-bit PowerPC virtual address is assumed. A 32-bit PowerPC real address is assumed. The page size of both the S/390 and the PowerPC architectures is 4096 bytes. None of these metrics are essential to the proper operation of the invention. They represent specific attributes of this particular embodiment.

Figure 1:
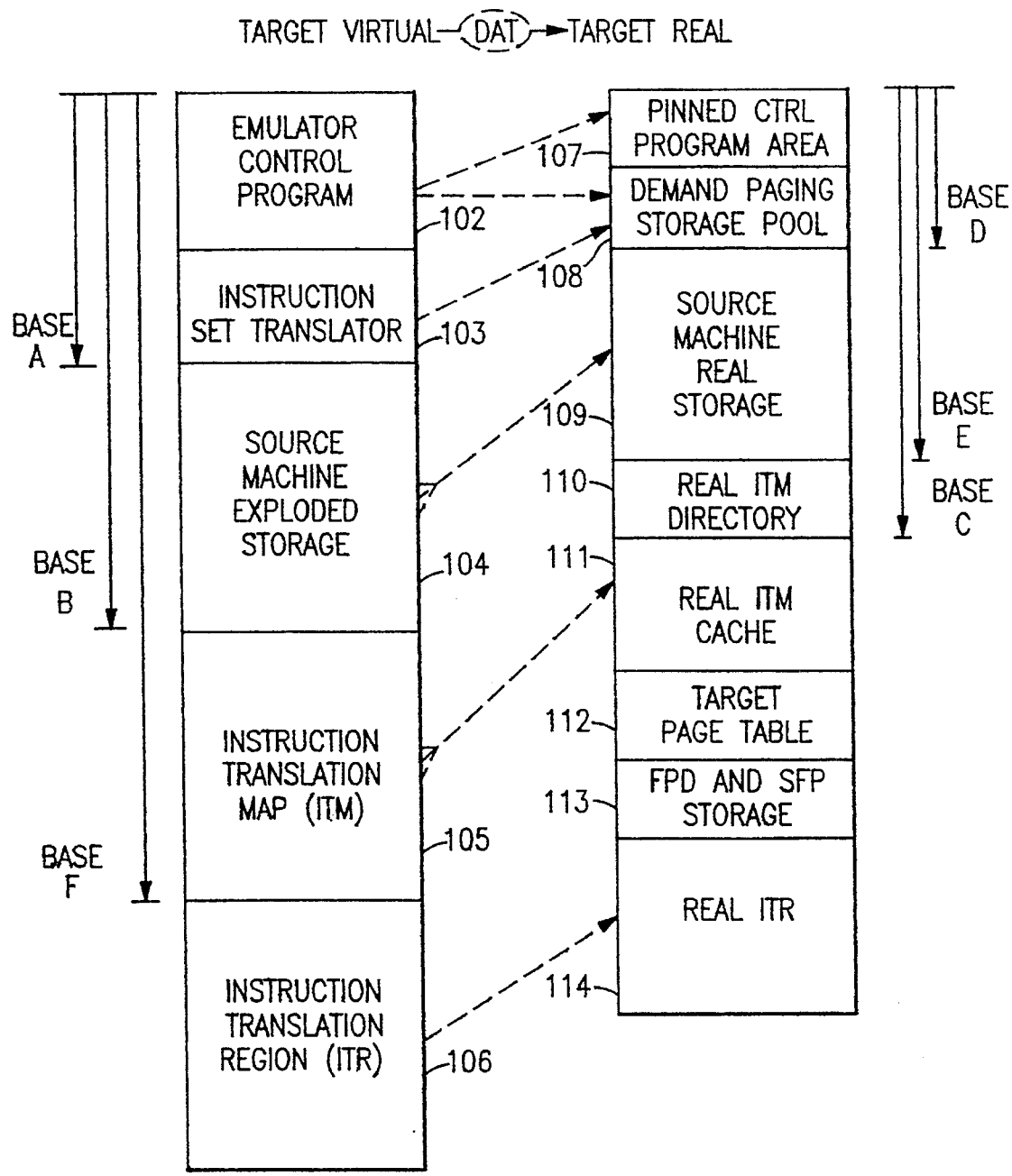
FIG. 1 shows the virtual storage and real storage maps of the the target machine processor.
Figure 2:
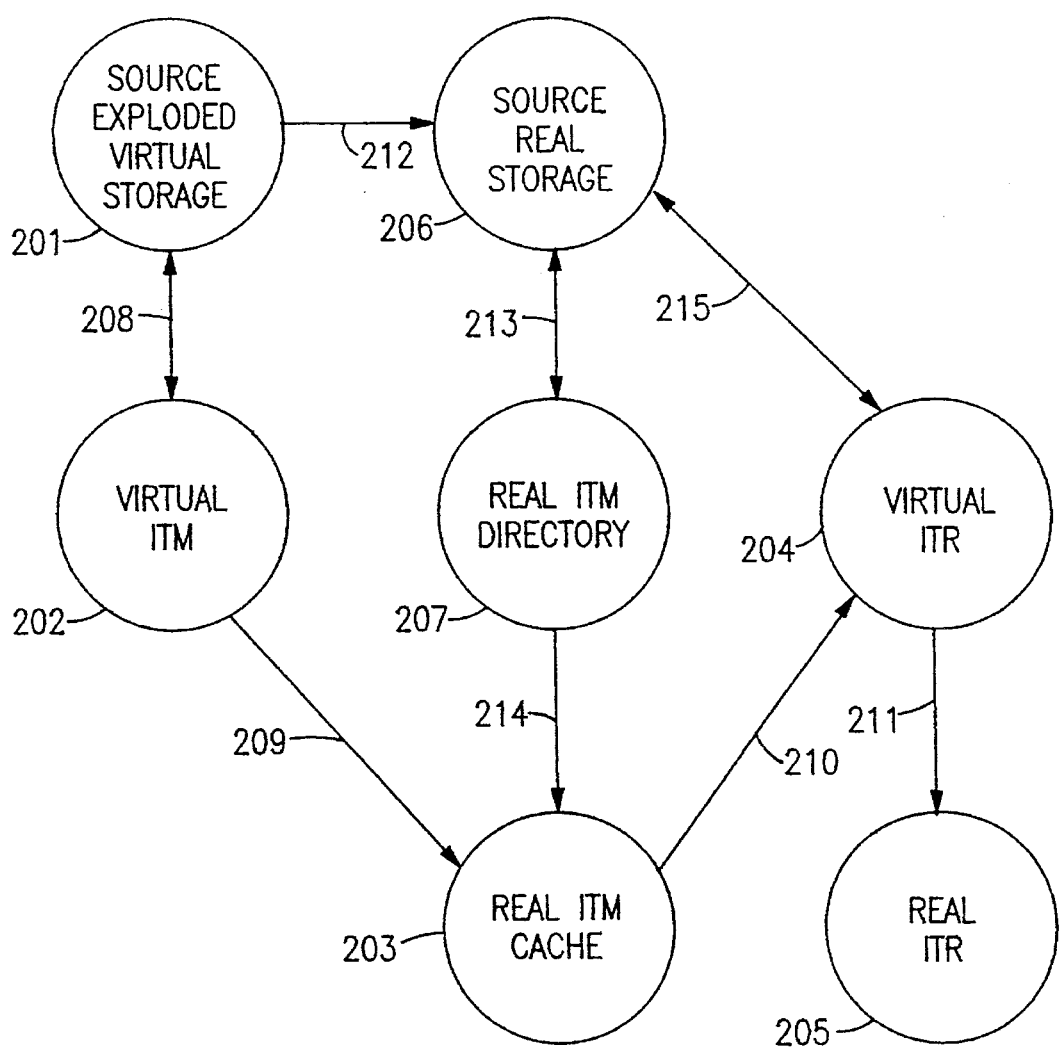
FIG. 2 shows the addressing relationships among the major structures used in this invention.
Figure 3:
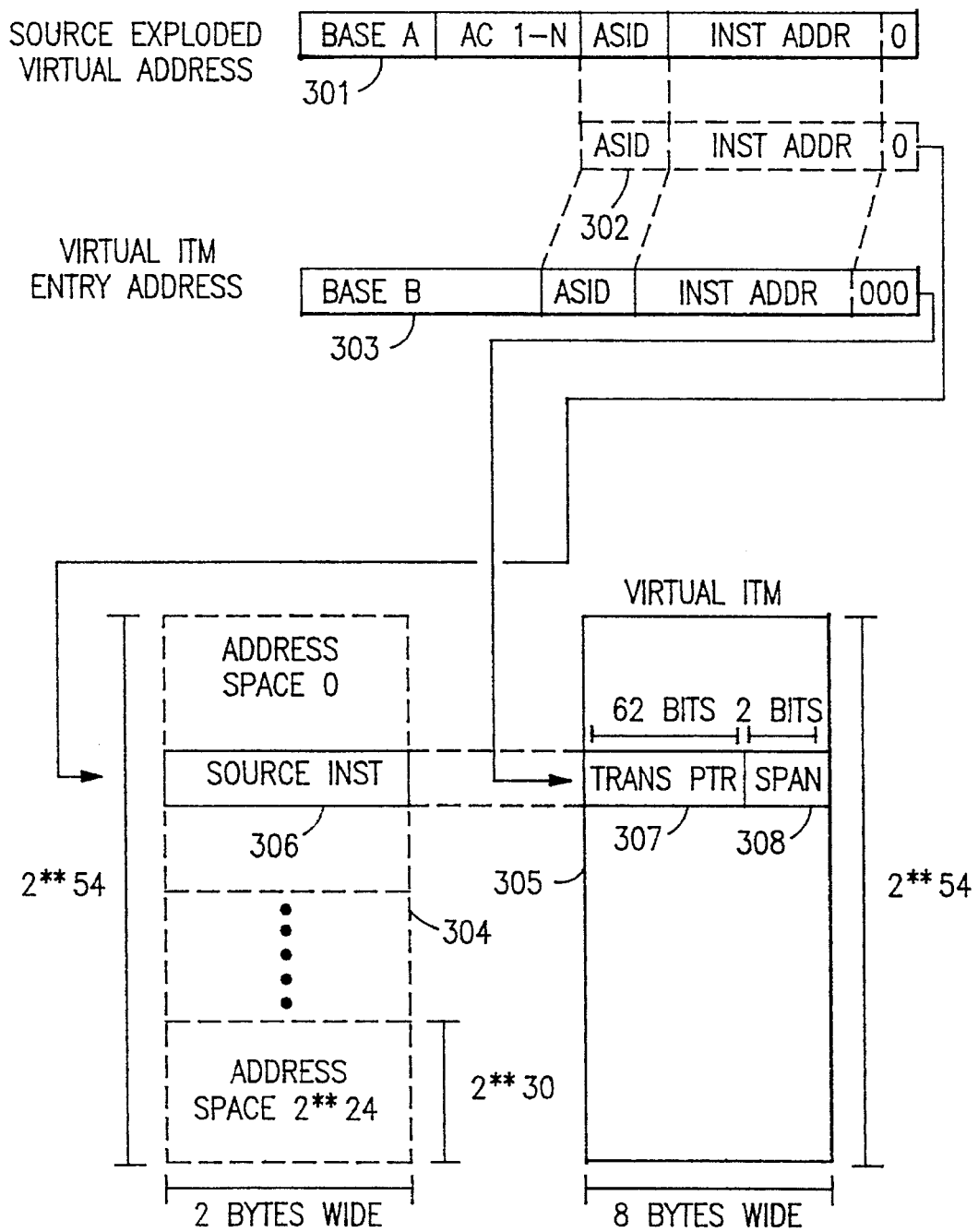
FIG. 3 illustrates the addressing relationship between a source instruction address in source exploded virtual form and the virtual address of the ITM entry that indicates its translation state.

FIG. 3 illustrates the addressing relationship between a source instruction address in source exploded virtual form (301) and the virtual address of the ITM entry (303) that indicates its translation state. The low order zero of the exploded address indicates that source machine instructions must start on a two-byte boundary. The ASID and instruction address portion of the exploded address are shifted two bits left because each ITM entry is eight bytes wide (four times larger than the two byte logical instruction location). The base B is the starting point of the ITM area (305) in the target virtual address map (see FIG. 1). Concatenating B with the shifted ASID and instruction address gives the virtual address of the ITM entry for the instruction at the source exploded virtual address. As explained earlier, the ITM entry contains a target virtual address (307) to be branched to during source program execution. The address will be that of the target instructions performing the function of the source instruction (306) if a translation already exists. Box 304 represents the total virtual storage containing all source instructions in all address spaces. If a translation does not exist, the address will be that of the translator, which, when entered in this way, will resume instruction translation at the source exploded virtual address of the untranslated instruction of the ITM entry. In this embodiment, target branches must be to locations on 4-byte boundaries, so the two low-order bits of the address are used to indicate the span (308) of the translation in terms of two byte units. That is, since the source instructions of this embodiment can be of length 2, 4, or 6, the span can indicate the scope of a translation in terms of the source storage occupied by the instruction translated. This is used when stores into the instruction stream are detected in order to discover which translations are contaminated and must be invalidated. The first bit indicates whether or not the ITM entry represents two bytes that are part of an instruction starting before these two bytes, and the second bit specifies whether or not the next two bytes in source storage are part of the same instruction as these two bytes. This mechanism is general and allows specification for source instructions of any length. The values assumed in this embodiment are specifications of the assumed source and target processors and are not essential to the invention. Persons skilled in the art can easily design an ITM and addressing relationship to fit any variety of source instruction length and target branch address specification.

Figure 4:
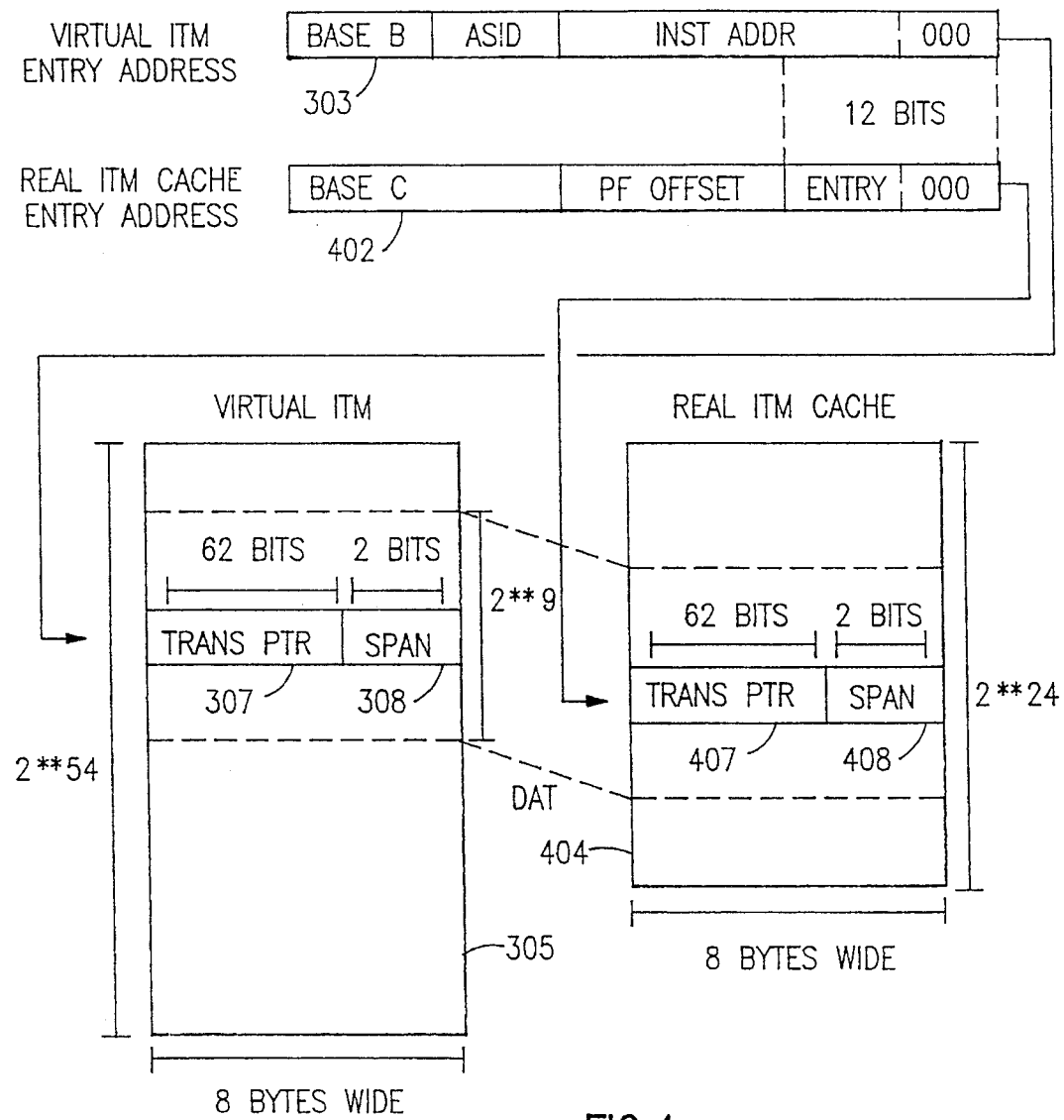
FIG. 4 illustrates the relationship between an ITM virtual section and a backing real ITM cache section.

FIG. 4 illustrates the relationship between an ITM virtual section and a backing real ITM cache section. Generally, storage management efficiency would tend to cause an ITM section to be designed as a target page in size in a particular embodiment. In this embodiment that is 4K bytes. However, this is not key to the invention. As indicated, target Dynamic Address Translation (DAT) forms the link between a virtual ITM section and its real ITM backing section in real storage. The Target Virtual ITM Entry Address (303) is as described for FIG. 3. Target DAT results in the target real ITM Cache Entry Address (402) which accesses the ITM in target real storage. Box 305 represents the virtual storage of the virtual ITM, while box 404 represents the entire real storage allocation for the real ITM cache. Fields 307 and 308 represent the Translation pointer and Span in a virtual ITM entry, while 407 and 408 represent the same fields in the real ITM backing store. These are the very same fields with 307 and 308 in virtual storage, and 407 and 408 in real storage. The fields are 64 bits wide with two bits containing the instruction span information, as explained earlier.

Figure 5:
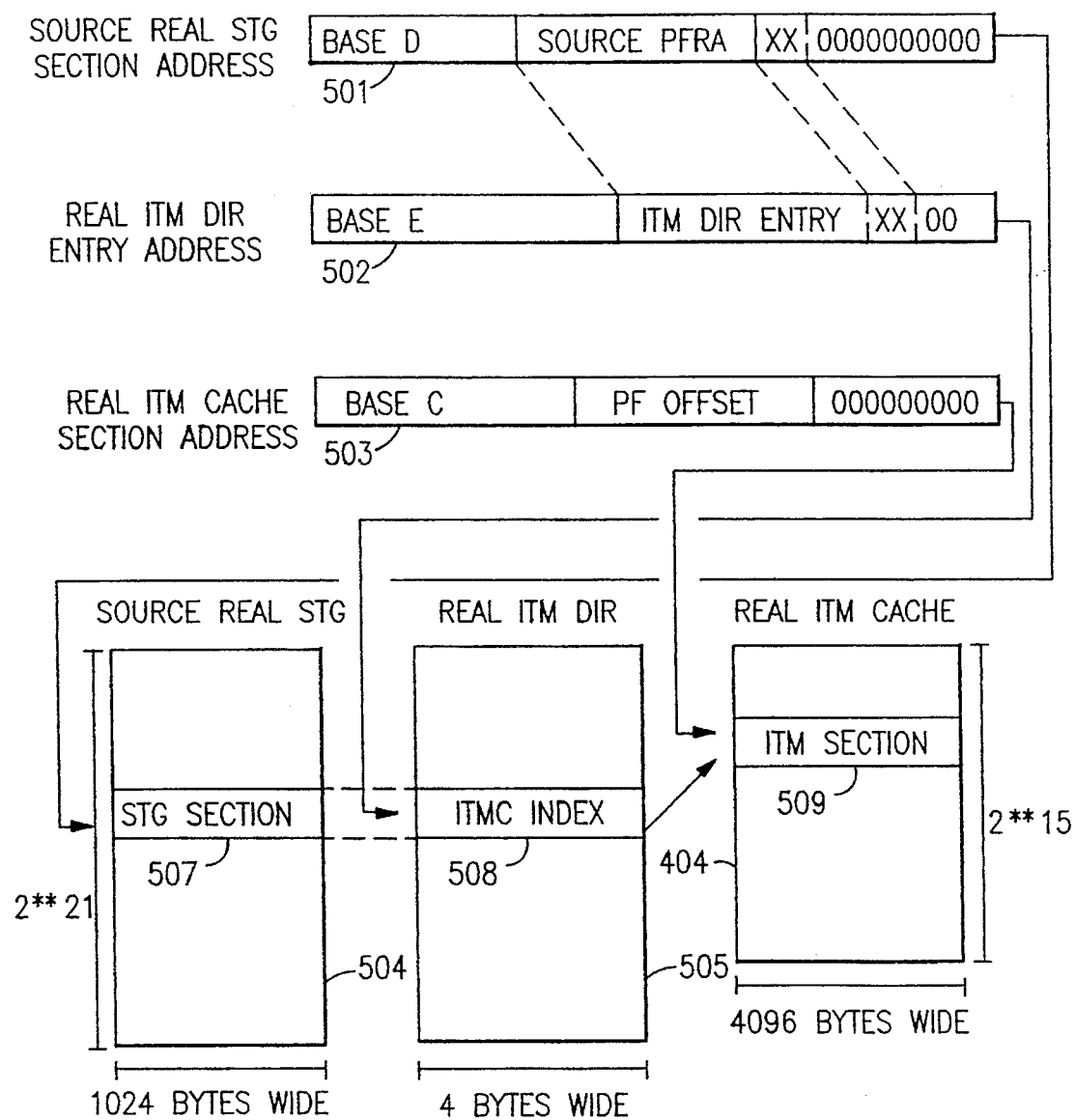
FIG. 5 illustrates how the address of an existing backing real ITM section can be found when a page fault occurs on a virtual ITM reference.

FIG. 5 illustrates how the address of an existing backing real ITM section can be found, if one exists, when a page fault occurs on a reference to an entry in a virtual ITM section. The process is described in FIG. 11. When such a page fault occurs, source DAT is performed on the ASID and instruction address (shown in FIG. 3) of the instruction to be performed in order to find its address in source real storage (504). In this embodiment, an ITM entry is 4 times as large as the instruction unit it represents. Therefore, if an ITM section size is chosen to be a page, the source storage section it represents is one-quarter of a page in size. Thus, to find an ITM section representing a particular instruction section it is necessary to include the two high-order bits of the within-a-page address of an instruction address, shown in the Source Real Storage Section Address (501) in FIG. 5 as XX, along with the Page-frame-real-address (PFRA). There is a Real ITM Directory (505) which indicates, for each Source Real Storage section, whether an ITM real section (509) exists in the Real ITM Cache or not, and, if so, what its address is. The Real ITM Directory Entry address (502) is calculated as shown by the relative source real storage section number (the PFRA extended on the right by the two high-order bits of the relative-within-a-page address, which are marked XX). In the general case, division is used, but in this embodiment shifting provides an efficient means for doing the division. In this embodiment, for example, an ITM section is 4K bytes, while a Real Storage section is 1K bytes. Thus, an ITM section represents the instructions in a quarter-page. To locate the proper ITM section for a source instruction, the relative address must include the two bits that specify which quarter of a page an instruction is in. This relative address is shifted to properly address the Directory entries as 4-byte entities. The base E is the starting point of the Directory in target storage, and is preappended to the relative Directory entry address to access it in target storage. As shown, the Real ITM Directory entry (508) contains the relative address of the Real ITM section for that source section, if one exists. It is combined with the base C to form the target machine real address (503) of the ITM section in the real ITM cache. It will be used to back all virtual ITM sections that represent those instructions. In other words, the same Real ITM section will back all virtual ITM sections for all address spaces that are in fact the same instructions. During emulation, this permits a set of the exact same instruction images which are a part of more than one instruction address space to use the same instruction translations. In S/390 systems, such storage areas, mapped into multiple address spaces, are called "Common" areas. For practicality, these areas are defined in units of the processor paging storage unit, i.e., they occupy an integral number of pages at page boundaries. In S/390, the same relative virtual pages of Common areas in all ASID's are backed in real storage by the very same pages since their content is, by definition, exactly the same. However, the exploded target virtual addresses of the areas are different in order to detect the specific ASID of reference in order to check the validity of the reference (see application Ser. No. 08/349,771, which is assumed by this invention). Since these different virtual addresses are really the "names" of the very same information, the same Real ITM section can back the different virtual ITM sections for them. If the Real ITM Directory indicates that there is no assigned Real ITM section in the Real ITM Cache, the emulator must newly assign a free page from the Real ITM Cache area to back the virtual ITM that is being processed, and indicate this in the Real ITM Directory Entry for the Source Real Storage section. This is described in FIG. 12.

Figure 6:
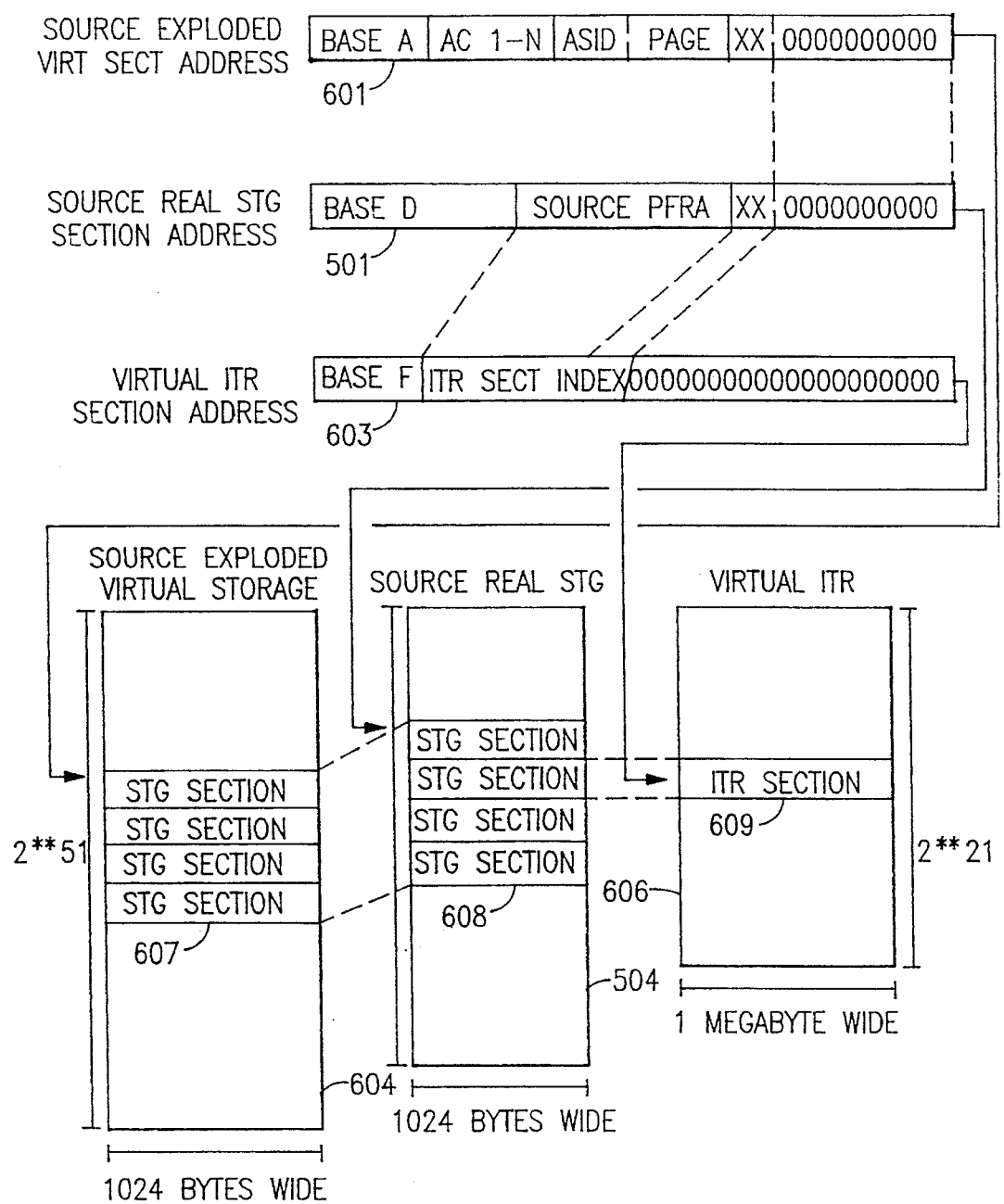
FIG. 6 shows the relationship between source real storage sections and target virtual ITR sections.

FIG. 6 shows the relationship between source real storage and the target virtual ITR sections that contain the target translations of all source instructions in the source real storage sections. As shown on the left, a source page (607), addressed by a source exploded virtual address (601) and mapped into target exploded virtual storage as a contiguous page, is actually four contiguous storage sections. That is because, in this embodiment, an ITM entry is four times as wide as a source minimal logical instruction. To make an ITM section one target page, the source storage section covered by that ITM is one-quarter of a page. Performing source machine DAT on the source address portion of the source exploded virtual section address locates the source real section in real page 608 in source real storage. Since relocation occurs at the page level, the page is contiguous in target real storage within the portion reserved to represent source real storage. The source real storage section address in target real storage is obtained by pre-appending base D to the beginning of it. Each storage section of each source real page will have its source-to-target instruction translations placed into a different Instruction Translation Region (ITR) section (609), as indicated by the dotted line between the two rightmost rectangles in the figure. In this embodiment, the size of an ITR section has been specified as one megabyte, though that is not central to the invention. An ITR section should be large enough to be expected to hold all of the translations of a source real storage section in order to avoid the complications of storage management that would otherwise be required. Given a source real storage section address (501), shown in the top portion of the figure, the virtual address (603) of the corresponding ITR section can be calculated. However, ITR sections are backed in target real storage only as required to hold the translations of source instructions, and this assignment can occur by demand paging as required. Thus, the direct relationship of a virtual ITR section with each section of a source program that may contain instructions is not costly in terms of real resources required by such a virtual storage assignment. That is because target DAT is used for the translation of virtual ITR references to target real addresses, by executing the process in target machine DAT-on mode. The address translation indicated between the second and third address types illustrated at the top of the figure uses the base F to properly place the ITR address into the assigned part of target virtual reserved for ITR sections. The page number is shifted to accomodate the expansion of ITR required beyond the size of the storage section (to one megabyte multiples, one for each source storage section), and the two high-order bits of the within-page address are used to address the proper storage section within the page. Generally, this transformation is a multiplication operation, but in this specific embodiment shifting is used as an efficient multiplication means.

Figure 7:
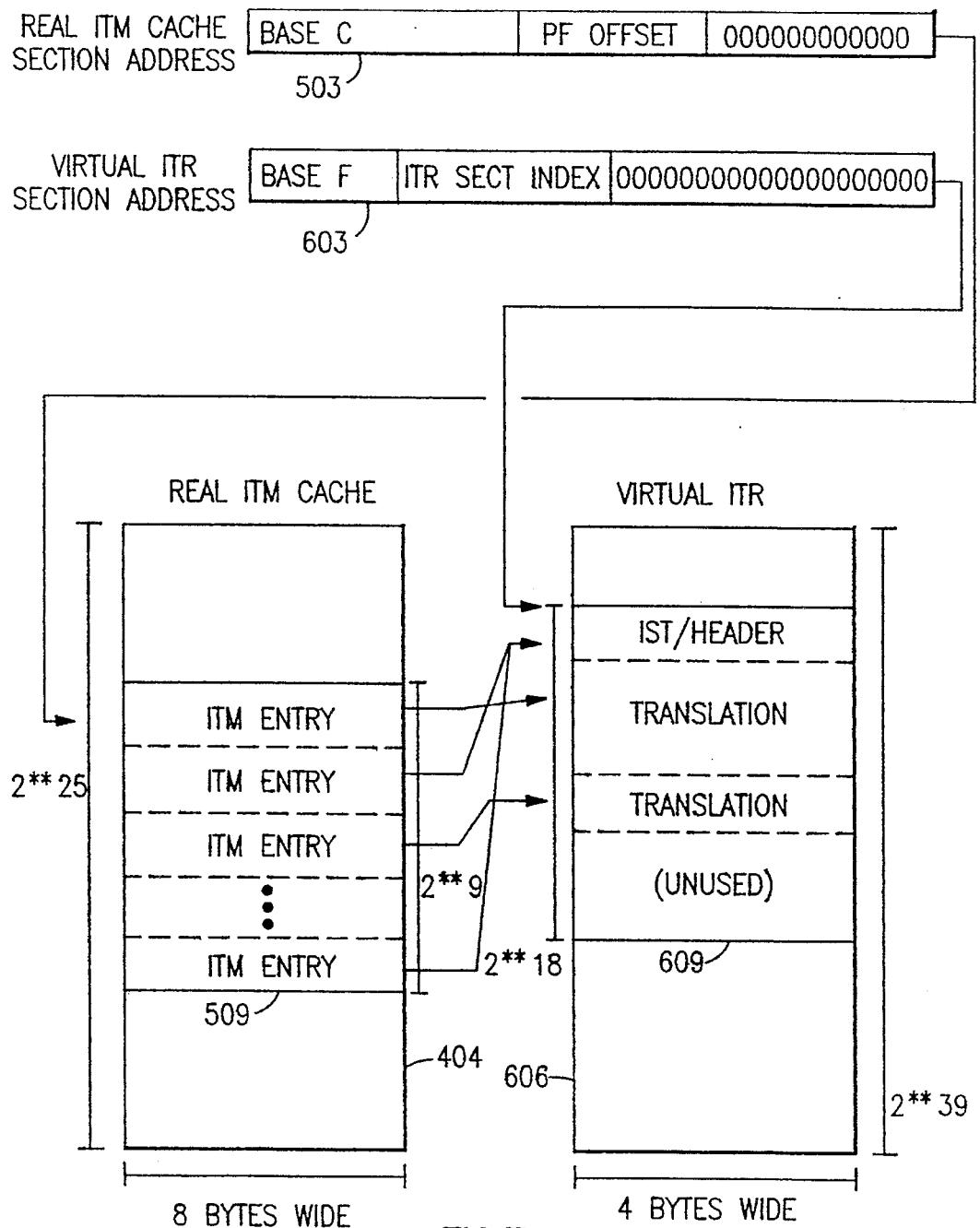
FIG. 7 shows the relationship real ITM entries and the ITR sections that contain instruction translations associated with the ITM entries.

FIG. 7 shows the relationship between ITM entries in ITM section 509 in the Real ITM Cache (404) and areas of the single ITR section (609) assigned to hold instruction translations of source instructions in the real storage section whose translation state is indicated by the ITM entries (eight bytes wide). The real ITM cache section address is illustrated by 503. The virtual ITR section address is depicted by 603. The ITM page is shown at the bottom of the figure on the left. The virtual ITR section 609 within the virtual ITR region 606 addressed by these entries is shown on the bottom to the right. As shown, some entries address instruction translations. Others address the address of the Translator (or IST) found in each ITR header. The latter is true when no translation yet exists for a source instruction unit (two bytes in this embodiment) but an ITM page does exist in the Real ITM Cache (404) for the source section containing an instruction unit. The only address relationship between a Real ITM Cache section and a Virtual ITR section is the direct address pointers within the ITM entries themselves.

Figure 8:
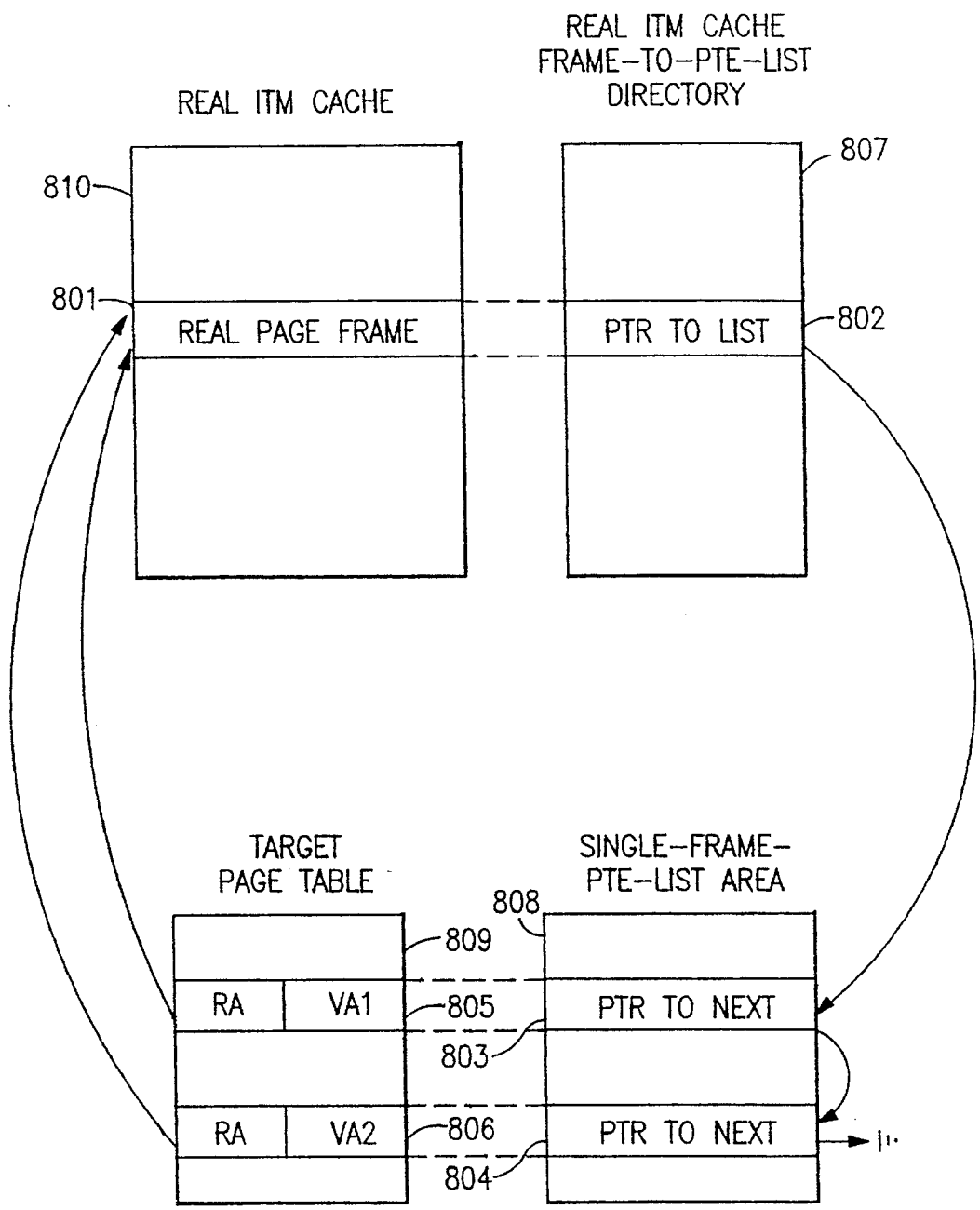
FIG. 8 shows the structure that associates target PTEs resolving different virtual ITM sections to the same real ITM section.

An ITM section represents the instructions potentially in a target virtual exploded storage section. Many such sections can be represented by the same ITM section in real storage because they represent the same source byte images in source real storage. When it is found that a virtual ITM section represents a section of source real storage for which there is an already existing ITM section, the virtual ITM section for it is backed by the same existing ITM section in real storage. As shown in FIG. 5, a Real ITM Directory indicates which source sections have existing real ITM sections for them. Since two different target exploded virtual addresses can be backed by the same real target page frame, it is possible that two different target PTE's may define different virtual addresses backed by the same page frame. FIG. 8 indicates how this is kept track of in order to allow disallocation of an ITM page frame when source program execution makes that necessary. If an ITM page is to be invalidated, it is necessary to clear all PTE's defining target virtual addresses backed by the page in order to ensure correct operation. A Real ITM Cache Frame-to-PTE-List Directory, which has one entry per Real ITM page frame, contains the heads of pointer lists associating PTE entries addressing ITM entries backed by the same real page frame in the Real ITM Cache. A Single-Frame-PTE list entry is defined, one for each PTE entry, through which a list of associated PTE's can chain. In the figure, pointer 802, in the real ITM cache frame-to-PTE list directory entry associated with real ITM page 801 in the real ITM cache (810) addresses the 803 entry in the PTE list (which is associated with PTE 805). It in turn addresses the 804 entry in the list (associated with PTE 806), which indicates the end of the list. This list is a consequence of having two PTE's, 805 and 806, in the Target Page Table 809 defining virtual ITM addresses VA1 and VA2, both backed by the same real ITM page 801. Should it be necessary to invalidate the ITM backed by page 801, the list is used to invalidate all PTE's that address it. The general mechanism is described more fully in application Ser. No. 08/349,771, which is assumed by this invention.

Figure 9:
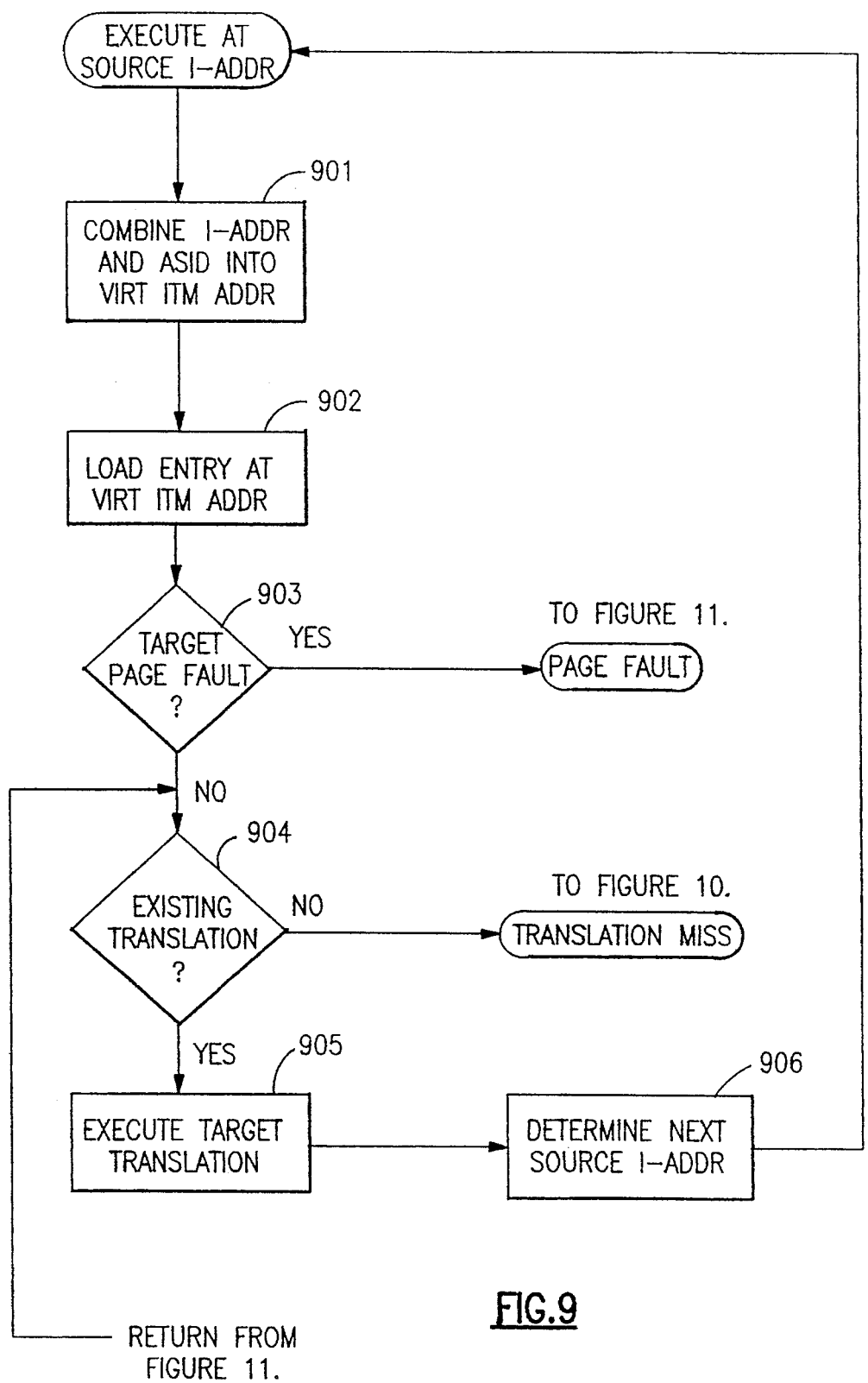
FIG. 9 shows the target processor overall logic for executing a source instruction.

FIG. 9 illustrates the target machine process for executing a source instruction. At step 901, the source machine instruction address is preappended with the Address Space Identification (ASID) of the executing program and a base quantity offset for the beginning of the Instruction Translation Map (ITM) in target virtual storage, and shifted to accomodate for the width of an ITM entry (see FIG. 3) and used to address the ITM entry for the source machine instruction to be executed. At step 902 the addressed ITM entry is loaded into a target machine working register. If a page fault results because of this fetch (903), the ITM is not backed in target real storage. The page fault handling is shown on FIG. 11. If there is no page fault (and also following resolution of an ITM page fault event) the ITM entry is tested to find out if there is an existing target instruction translation for the current source instruction in step 904. If not, a translation miss is said to have occurred. The translation miss processing is shown on FIG. 10. If an instruction translation exists, the target instructions providing the effect of the source instructions being executed are themselves executed at step 905. The source next-instruction address is then calculated at step 906 and control transfers to step 901 to perform the execution process for the next set of source instructions.

Figure 10:
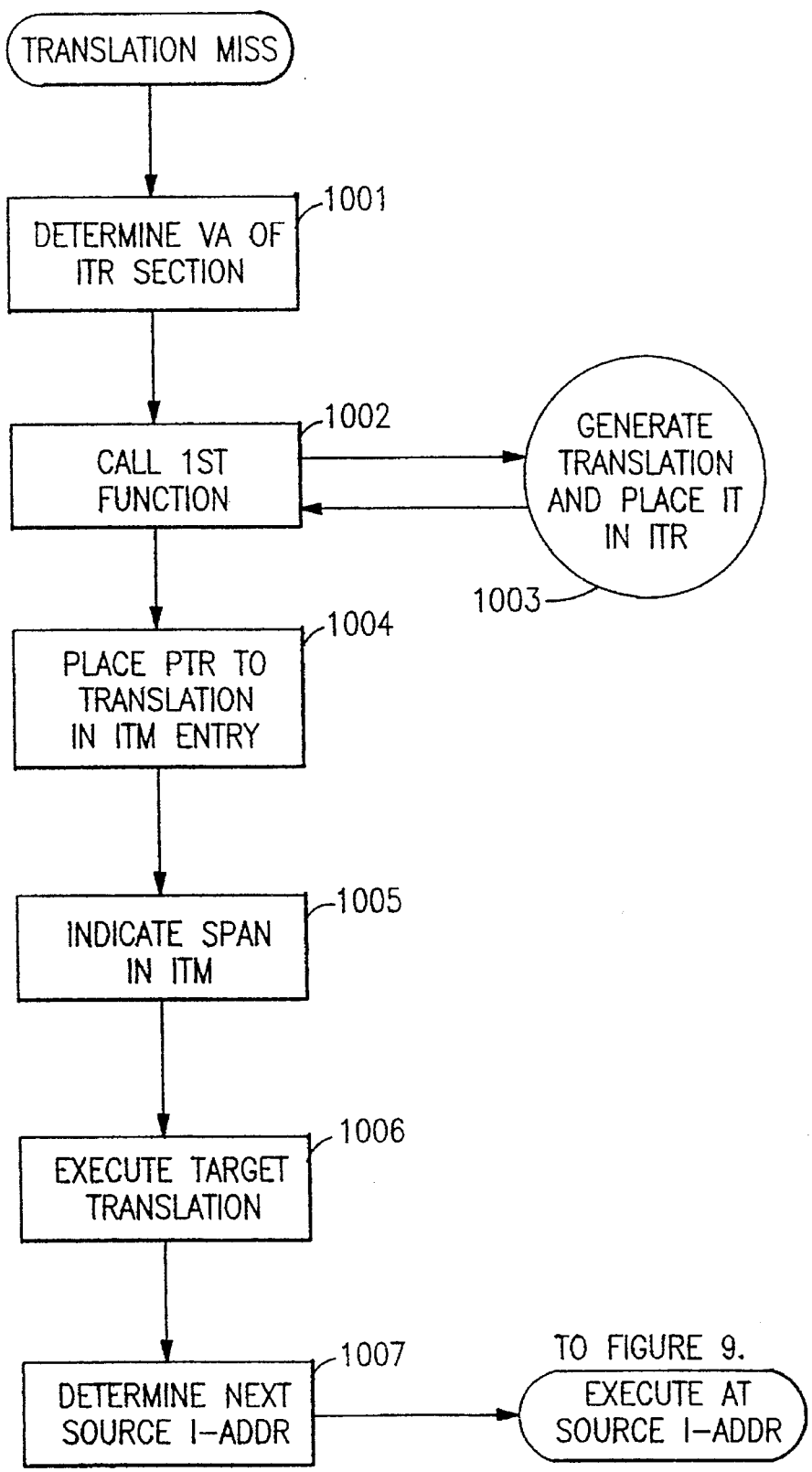
FIG. 10 illustrates the target processor logic for handing an instruction translation miss occurs.

FIG. 10 illustrates the processing performed when a translation miss occurs. That is, there is no existing target machine instruction translation for the source machine instruction to be executed. Step 1001 determines the target machine virtual address of the Instruction Translation Region (ITR) section that will hold the instructions of the translation when they are produced. It is uniquely identified by the pointer to the translator entry in the ITR section, which pointer is found in the ITM entry which caused the translation miss, and was used to access this logic. (ITR sections are backed by target storage when accessed during processing but pages of ITR sections are pageable by the target real storage manager. Page faults on these pages are resolved by normal prior-art methods without special processing so the processing of such page faults is not shown here). The addressing relationship is depicted in FIG. 5. Step 1002 calls the instruction translator (IST) to create the set of target instructions that will produce exactly the same effect in execution as the source instruction being executed, and to place them in the ITR section. On return from the translator, the address in the ITR of the newly created instruction translation is placed into the ITM entry for the source instruction, at step 1004. For a source instruction which spans multiple instruction units, only the first ITM entry associated with the instruction is set to point to the translation. The instruction translation supplied by the translator will be used repeatedly each time the same source instruction is subsequently to be executed, assuming there has been no change to the source instruction in the meantime. The ITM indicates the location of the existing instruction translation allowing it to be directly invoked without further action by the translator function. Step 1005 indicates the span of the translation in the ITM entry to indicate the number of source bytes in the instruction stream covered by the translation in the ITR to which the ITM now points. This is done by marking each ITM entry for instruction units that are part of this same multi-unit source instruction as being associated with this source instruction as described in FIG. 3. This can be used on stores into the instruction stream to indicate whether a translation has been invalidated by a store operation in the source program into an area that currently or previously contained instructions that were executed. The instruction translation is executed at step 1006, the next source machine instruction address is calculated at step 1007, and control transfers to the top of FIG. 9, at step 901, to perform the execution process for the next set of source instructions.

Figure 11:
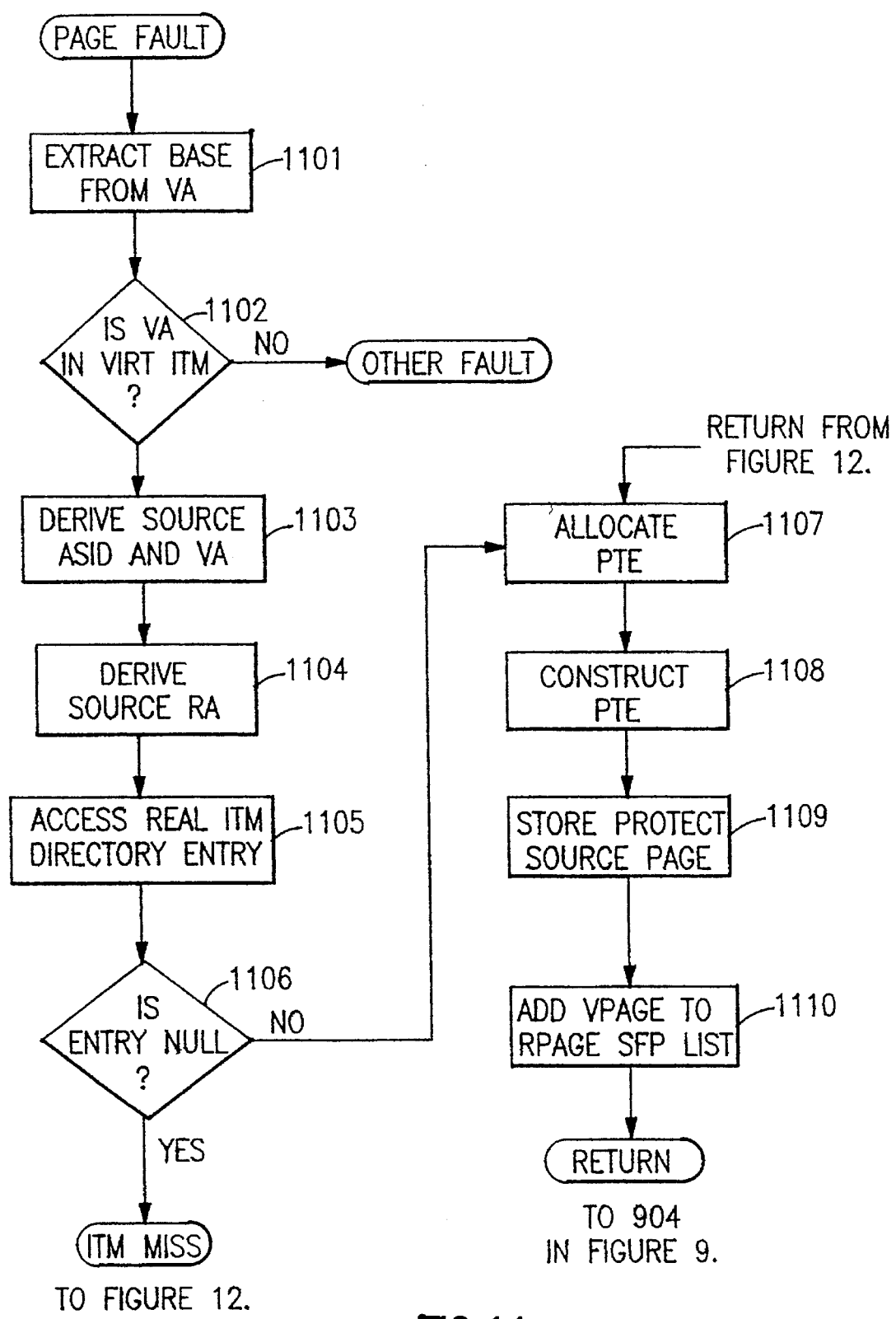
FIG. 11 shows the processing performed when a page fault occurs on a reference to an ITM entry.

FIG. 11 shows the processing performed when a page fault occurs on the reference to an ITM entry in the processing depicted in FIG. 9. The base portion of the extended target virtual machine address that caused the page fault is extracted at step 1101. This is tested at step 1102 to check for an ITM page fault. If the base address portion is not that for the ITM table area in target virtual storage, some other type page fault has occurred and transfer is made to the real storage manager for routine page fault processing of the event. This is not shown here since many methods are previously described in prior art for demand paging of virtual storage. If step 1102 determines that the page fault was on an access to an ITM entry, step 1103 extracts the source ASID and source address, which indicate the ITM entry from the source exploded virtual address of the source instruction whose ITM entry is sought. For example, in S/390 ESA this would include the ASID and the virtual address of the instruction within that address space. Using the source machine Dynamic Address Translation (DAT) method, the source real address assigned to that source virtual address by the source operating system is calculated at step 1104. Using the source real address, the address of the real ITM directory entry for the ITM section for the source real storage page is calculated in step 1105. There is a direct addressing relationship between source real storage pages and that directory of ITM sections in target real storage. The addressed directory entry is tested at step 1106 to ascertain whether or not an ITM section exists in real storage for that source real page. If not (the entry is NULL), control passes to FIG. 12 to handle the ITM miss condition. The initial state of the real ITM directory has all entries set to NULL. If the ITM section exists, a target machine Page Table Entry (PTE) is selected and allocated for this purpose at step 1107, and the contents of the PTE are constructed to address the required page of ITM entries at step 1108. At step 1109 store protection of the source page is established to allow detection by the target machine of store operations by target instructions of source machine translations into the page of source instructions represented by the ITM being established in the PTE. The PTE is made part of the single-frame PTE list for the target real page to which the PTE resolves references through it, at step 1110. The structure of the single-frame PTE list is illustrated in FIG. 8. Since multiple target virtual addresses of ITM section pages can resolve to the same ITM target real page frame address, a mechanism is needed to indicate all PTEs resolving to a single frame so that, if a frame is deallocated and reassigned to another use, all PTEs resolving to it can be invalidated. The single-frame PTE list is utilized to provide this function by relating all PTEs resolving to the same page frame real storage address. Control returns to step 904 of FIG. 9.

Figure 12:
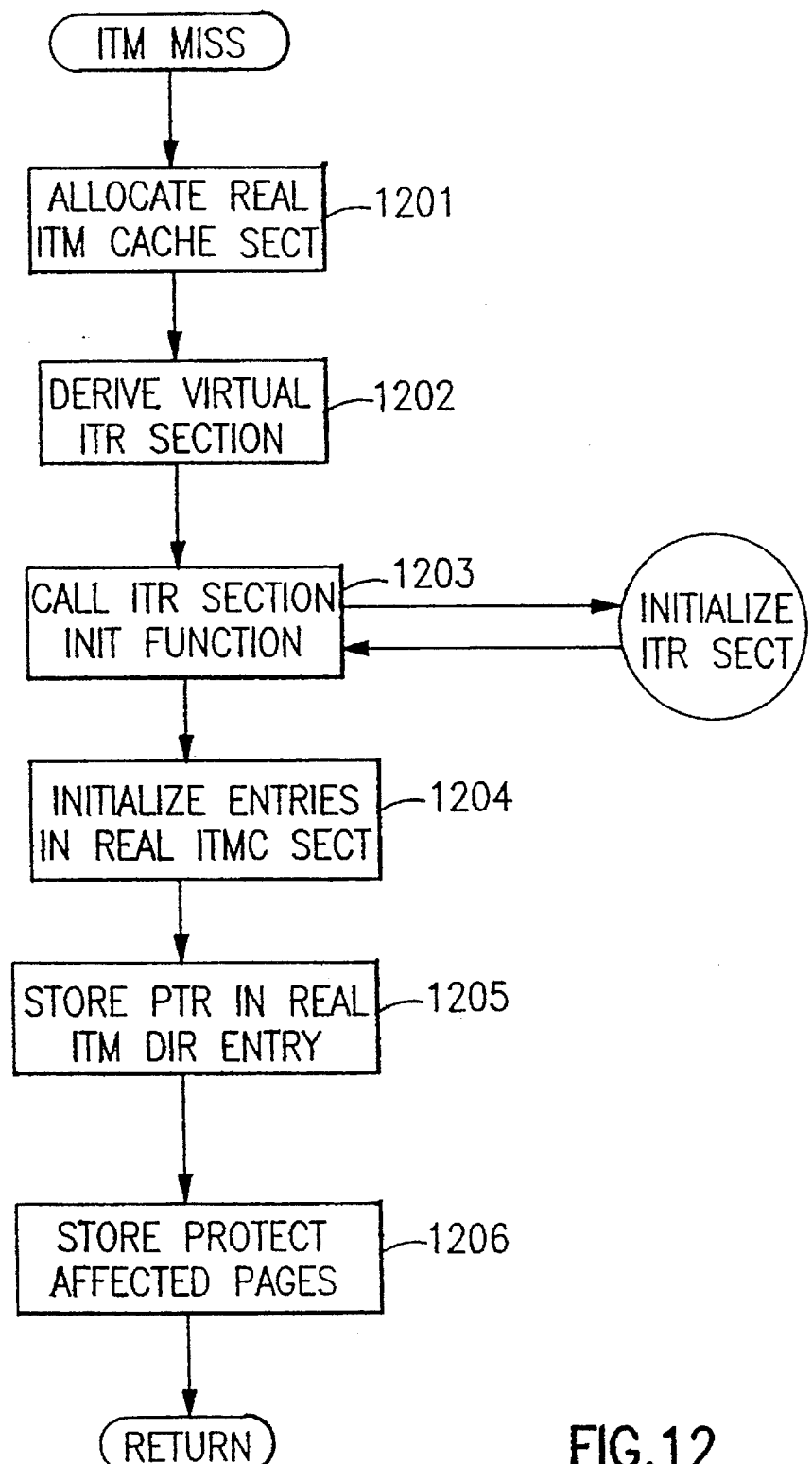
FIG. 12 shows the processing when a real ITM section must be assigned to back a virtual ITM section.

FIG. 12 depicts the process for an ITM miss situation. If the ITM directory entry for an ITM section is NULL, real storage for an ITM cache section must be allocated. The storage is selected and allocated for the ITM section at step 1201 from the pool of target real pages assigned for this purpose. At step 1202 the target machine virtual address of the ITR section that is to hold the translations of source instructions from the source page represented by the ITM section being allocated in target real storage is computed. As explained earlier (see FIG. 5), there is a direct addressing relationship between a source real page and a virtual ITR section whose address can be used to access the translations of source instructions in that page.

The source real page address computed in step 1104 of FIG. 11 is used to determine the virtual ITR section address.

Step 1203 calls a function that initializes the header of an ITR section in preparation for its receiving instruction translations. Step 1204 initializes the entries in the ITM section to transfer to the translator function, which will occur at source instruction execution until an entry is replaced by the target virtual address of a translation in the ITR section, by action of the translator, the first time the source instruction is encountered for execution. The format of an entry in the ITM section is depicted in FIG. 5. Step 1205 sets the ITM directory entry for the real storage section (from 1104) to address the newly allocated real ITM cache section. An entry in the real ITM directory is illustrated in FIG. 7. All source exploded virtual storage pages represented by the newly-backed ITM section are store-protected in order to provide notification of any store that should cause invalidation of an existing source instruction translation, as was described in the Summary. This is done at step 1206. Return is then made to step 1107 on FIG. 11 to continue ITM page fault processing.

Figure 13:
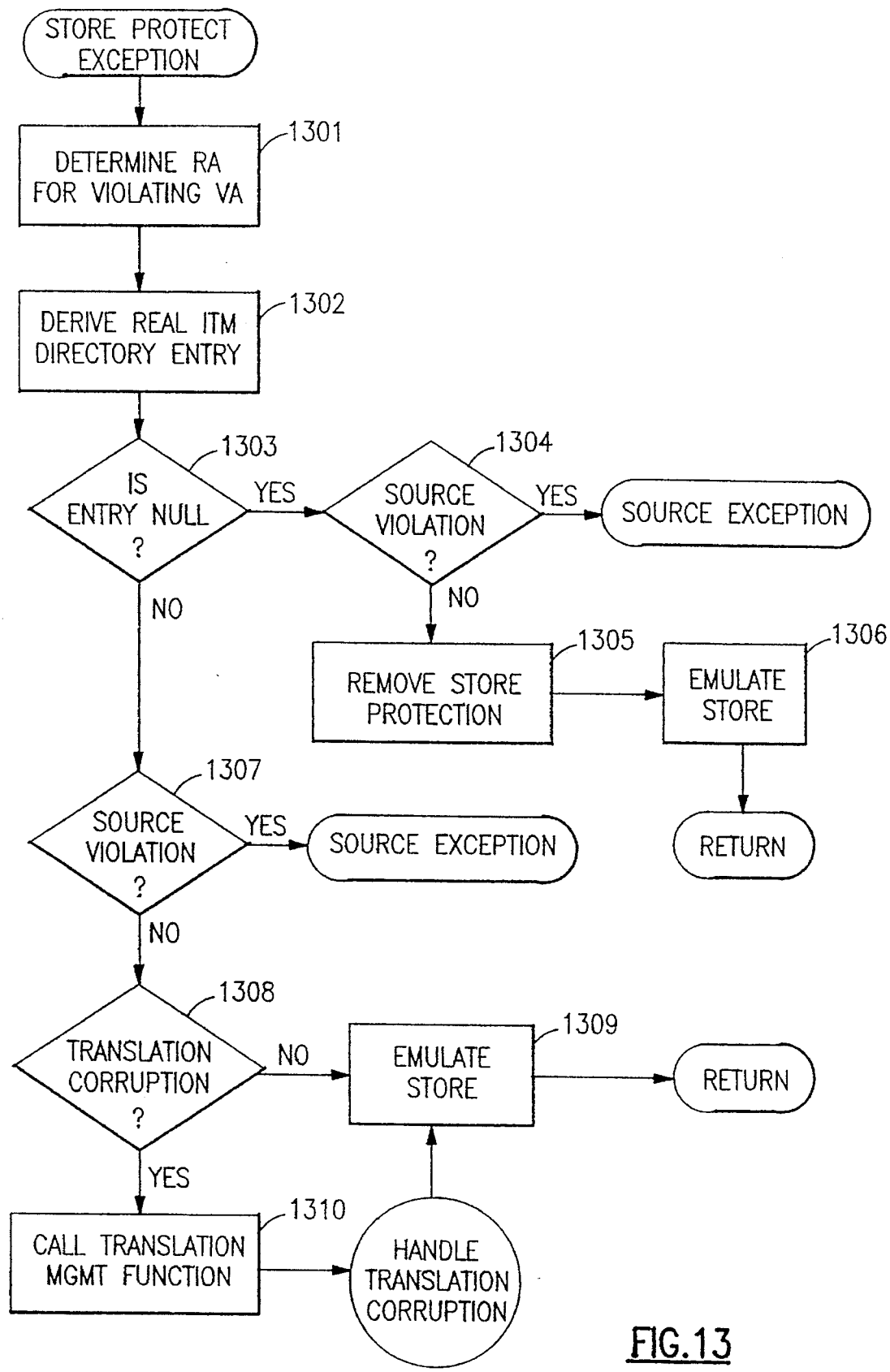
FIG. 13 shows the process for a source program store operation into a source real storage section from which some instructions have already been translated to target instructions.

FIG. 13 indicates the processing that occurs when a store protection exception is encountered during execution of the instructions of translations of source instructions, i.e., the source program is modifying an area that may contain instructions that may have already been translated to target instructions. Step 1301 calculates the source real address of the target virtual address that resulted in the protection exception. At step 1302, the source real address of the reference is used to determine the real ITM directory entry for the ITM for instructions in the source page of the reference. Step 1303 tests that real ITM directory entry. If it is NULL, no instruction translations exist for that source storage section. The protection violation may be a source architecture violation. The rules of the source architecture are used to check for such a violation at step 1304. If there has been such a violation, it is reported to the source operating system under the source architecture rules for handling such notification within the source operating environment. If not, the store protection is removed at step 1305, the store is performed in the source storage within target storage at step 1306, and return is made to the instruction following that which caused the exception in the target translation of the subject instruction specifying the store operation. If the real ITM directory entry was found not to be NULL at step 1303, a check is made using source architecture rules to ascertain whether or not a source protection exception occurred at step 1307. If so, this is communicated to the source operating system in accordance with the source rules for source communication of such an event in the source machine. If it is not a source program violation, then step 1308 tests for a translation corruption, i.e, whether or not the store changes a source location for which there exists a current target machine translation. The storage extent of the store operation is calculated and that extent is checked in the corresponding ITM section to see whether the change is affecting any part of the span of any translated source instruction(s). If not, the store is performed at step 1309 in the source storage as mapped in target storage, and control returns to the next target instruction to be executed within a source instruction translation. If there has been an instruction translation corruption as a result of the store operation in source machine storage, the translation management function is called to invalidate those translations affected, at step 1310. Control then passes to step 1309 to perform the specified store operation in source machine real storage.

Finally, it is necessary to extend the PTE allocation process described in FIG. 27 of application Ser. No. 08/349, 771, which is assumed by this invention. When a new PTE is allocated to back a target exploded virtual address with a target real page frame which represents a source real page, the real ITM directory described in this invention must be consulted to determine if the real page has an real ITM cache section allocated to it. If so, the PTE must be store protected to trap stores into a page which contains source instructions.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

Having thus described our invention, what we claim as new and desire to secure by Letters patent is:

1. An emulation method for executing individual source instructions in a target processor to execute source programs requiring source processor features not built into the target processor, comprising the steps of:

inputting instructions of a source processor program to an emulation target processor having significant excess virtual addressing capacity compared to a virtual addressing capacity required for a source processor to natively execute the source processor program, and supporting multiple source virtual address spaces in the operation of the source processor, building a virtual ITM (instruction translation map) in a target virtual address space supported by the target processor, the virtual ITM containing an ITM entry for each source instruction addressable unit, each source instruction addressable unit beginning on a source storage instruction boundary, structuring each ITM entry for containing a translation address to a target translation program that executes a source instruction having a source address associated with the ITM entry, determining a ratio R by dividing the length of each ITM entry by the length of each source instruction addressable unit, accessing an ITM entry for an executing source instruction by:

generating a source aggregate virtual address for the source instruction by combining the source address of the source instruction with a source address space identifier of a source virtual address space containing the instruction, multiplying the source aggregate virtual address by R to obtain a target virtual address component, and inserting the target virtual address component into a predetermined component location in a target virtual address to generate an ITM entry target virtual address for locating an ITM entry associated with the source instruction in order to obtain a one-to-one addressing relationship between ITM entry target virtual addresses and source instruction addresses.

2. A source emulation system for executing source instructions in a target processor as defined in claim 1, further comprising the step of:

structuring each ITM entry with at least two fields: a pointer field for containing a target instruction translation address, and a span field for containing a span indication that indicates if the ITM entry is part of a set of ITM entries associated with the same source instruction for handling source variable length instructions.

3. A source emulation system for executing source instructions in a target processor as defined in claim 2, further comprising the step of:

using the source real address of a source instruction represented by an ITM entry to determine if an ITM section exists for the virtual ITM section containing the entry, and translating an ITM entry target virtual address to a backing ITM entry target real address of a backing ITM entry in an assigned target page frame (PF) in real storage of a target processor, the target PF containing a subset of backing ITM entries for backing a section of the virtual ITM in target real storage, each backing ITM entry in the target PF supporting the pointer field and the span field in a corresponding virtual ITM entry.

4. A source emulation system for executing source instructions in a target processor as defined in claim 3, further comprising the step of:

signalling a page fault if the ITM section target virtual address has no backing target PF, using source DAT to determine the source real address of the currently executing instruction, using the source real address of the instruction to index to an entry in the real ITM directory to determine if a real ITM cache section is already defined for the source real storage section which includes the currently executing source instruction, allocating a target PF from the real ITM cache if one does not exist, initializing the target PF when it is assigned to back the ITM target virtual address by setting each pointer field in the target PF to a value interpreted as a translator address for locating a translator program in the target virtual storage for generating target translations which are target programs that execute source instructions, and indicating the target PF in the real ITM directory entry associated with the source real storage section containing the currently executing source instruction.

5. A source emulation system for executing source instructions in a target processor as defined in claim 4, further comprising the step of:

signalling a page fault if the ITM section target virtual address has no backing target PF, using source DAT to determine the source real address of the currently executing instruction, using the source real address of the instruction to index to an entry in the real ITM directory to determine if a real ITM cache section is already defined for the source real storage section which includes the currently executing source instruction, and backing the virtual section ITM section for the currently executing source instruction with the same real ITM cache section if one exists.

6. A source emulation system for executing source instructions in a target processor as defined in claim 5, further comprising the steps of:

accessing the pointer field of the backing ITM entry for obtaining a translator address to enter the translator program, assigning a virtual instruction translation region (virtual ITR) in target virtual storage for locating the translator program and instruction translations of previously executed source instructions, executing the translator program for generating a target translation for a currently executing source instruction when the backing ITM entry does not contain a pointer to an instruction translation, storing the target translation in a page within a virtual ITR section, associated with the source section containing the instruction and located by a translation target virtual address, writing the translation target virtual address in the pointer field of the backing ITM entry for the executing source instruction to overlay the translator address to enable a direct access of the target translation from the backing ITM entry for enabling a later execution of the source instruction to bypass the translator program, and setting the span field in the backing ITM entry to a span indication indicating if the ITM entry is part of a set of consecutive backing ITM entries associated with the executing source instruction, and setting the span field in each other backing ITM entry in the set to a span indication that indicates which backing ITM entries are part of the consecutive set.

7. A source emulation system for an executing source instruction in a target processor as defined in claim 6, further comprising the steps of:

accessing the translation target virtual address in the pointer field in the backing ITM entry when subsequently executing a previously executed source instruction associated with the ITM entry, performing dynamic address translation (DAT) on the translation target virtual address to locate a backing target PF in target real storage containing at least the beginning of the target translation for the previously executed source instruction, and executing target instructions of the target translation in the target PF to emulate execution of the executing source instruction.

8. A source emulation system for executing source instructions in a target processor as defined in claim 7, further comprising the step of:

signalling an ITR page fault if the translation target virtual address has no backing target PF for the ITR page.

9. An emulation system for an executing source instructions in a target processor as defined in claim 2, further comprising the step of:

accessing the backing ITM entry in the backing section target PF at the target real address associated with the source instruction located at a different source virtual address location by using a source DAT process, wherein the backing section of the target PF is used to back multiple copies of the same instruction in different source virtual locations to avoid having multiple copies of the backing section in target real storage for multiple source copies of the same source instruction.

10. A source emulation system for executing source instructions in a target processor as defined in claim 6, further comprising the steps of:

determining if an existing ITR virtual pointer in an existing real ITM entry in a backing PF locates an existing instruction translation previously determined for the same source instruction as the currently executing source instruction but at a different source virtual address, and backing the ITM section for the currently executing source instruction by the same PF, and the same instruction translation being used for multiple source virtual addresses containing the same source instruction.

11. A source emulation system for executing source instructions in a target processor as defined in claim 7, further comprising the steps of:

protecting target page frames (PFs) in target storage which contain previously translated source instructions from being stored into by the target processor, detecting each source real storage address of each source instruction subject to a source store operation, determining all target virtual addresses of all ITM entries associated with previously translated source instructions detected as being stored into, using the span field of the ITM entry associated with the first source byte store into to determine the first source byte of the first source instruction unit affected by a store operation, setting the ITM entry for that first affected source instruction to an untranslated state, setting to an untranslated state the pointer field in a first ITM entry associated with the first instruction unit of each other translated instruction affected by a store operation, also setting the span field to an unassociated state in all ITM entries associated with each source instruction stored into, the settings in the pointer and span fields of all ITM entries associated with all stored-into source instructions being set to indicate no association with any source instruction, and then performing corresponding store operations in target real storage for the same instructions.

12. A source emulation system for executing source instructions in a target processor as defined in claim 7, further comprising the step of:

maintaining a fixed allocation relationship of ITR virtual sections to source real storage sections, using the fixed allocation relationship to directly access an ITR virtual section given a source real storage section address, and using the real ITR pages as needed to back virtual ITR pages to hold instruction translations for efficiently using real storage, while using target virtual storage to provide direct addressing access of the ITR pages.

* * * * *

UNITED STATES PATENT AND TRADEMARK OFFICE
CERTIFICATE OF CORRECTION

PATENT NO. : 5,560,013
DATED : Sep. 24, 1996
INVENTOR(S) : Casper A. Scalzi et al.

It is certified that error appears in the above-indentified patent and that said Letters Patent is hereby corrected as shown below:

Column 6, line 44     "2\*\*(46)=65536" should be —2\*\*16 = 65536—.

Signed and Sealed this

Seventh Day of January, 1997

Attest:

BRUCE LEHMAN

Attesting Officer     Commissioner of Patents and Trademarks